(12) United States Patent
Sun et al.

(10) Patent No.: US 11,476,549 B2
(45) Date of Patent: Oct. 18, 2022

(54) THREE-DIMENSIONAL FOLDED BATTERY UNIT AND METHODS FOR MANUFACTURING THE SAME

(71) Applicant: Millibatt, Inc., Los Angeles, CA (US)

(72) Inventors: Guangyi Sun, Los Angeles, CA (US); Janet Hur, Los Angeles, CA (US); Cheolwoong Lim, Los Angeles, CA (US); Leland Smith, Los Angeles, CA (US)

(73) Assignee: Millibatt, Inc., Los Angeles, CA (US)

( * ) Notice: Subject to any disclaimer, the term of this patent is extended or adjusted under 35 U.S.C. 154(b) by 0 days.

(21) Appl. No.: 17/407,109

(22) Filed: Aug. 19, 2021

(65) Prior Publication Data
US 2022/0059910 A1 Feb. 24, 2022

Related U.S. Application Data

(60) Provisional application No. 63/135,203, filed on Jan. 8, 2021, provisional application No. 63/067,773, filed on Aug. 19, 2020.

(51) Int. Cl.
*H01M 50/54* (2021.01)
*H01M 50/109* (2021.01)
(Continued)

(52) U.S. Cl.
CPC ......... *H01M 50/54* (2021.01); *H01M 4/0404* (2013.01); *H01M 4/0419* (2013.01);
(Continued)

(58) Field of Classification Search
CPC .............................................. H01M 10/0583
See application file for complete search history.

(56) References Cited

U.S. PATENT DOCUMENTS

| 4,976,897 A | 12/1990 | Callahan et al. |
| 5,213,949 A | 5/1993 | Kojima et al. |

(Continued)

FOREIGN PATENT DOCUMENTS

| KR | 101519278 B1 | 5/2015 |
| WO | 2014142311 A1 | 9/2014 |

(Continued)

OTHER PUBLICATIONS

ISR received in PCT/US2021/046787 dated Nov. 9, 2021.
(Continued)

*Primary Examiner* — Stephan J Essex
(74) *Attorney, Agent, or Firm* — Run8 Patent Group, LLC; Peter Miller

(57) ABSTRACT

One variation of a battery unit includes: a series of anode collectors; a set of anode electrodes including anode material arranged on both side of the anode collectors; a set of anode interconnects interposed between and electrically coupling adjacent anode collectors and folded to locate the anode collectors in a boustrophedonic anode stack; a series of cathode collectors; a set of cathode electrodes including cathode material arranged on both side of the cathode collectors; a set of cathode interconnects interposed between and electrically coupling adjacent cathode collectors and folded to locate the cathode collectors in a boustrophedonic cathode stack with cathode collectors interdigitated between anode collectors in the boustrophedonic anode stack; and a set of separators arranged between the anode and cathode electrodes and transporting solvated ions between the anode and cathode electrodes.

20 Claims, 13 Drawing Sheets

(51) Int. Cl.
  *H01M 50/417* (2021.01)
  *H01M 50/463* (2021.01)
  *H01M 10/058* (2010.01)
  *H01M 50/534* (2021.01)
  *H01M 4/587* (2010.01)
  *H01M 10/0525* (2010.01)
  *H01M 50/403* (2021.01)
  *H01M 10/0583* (2010.01)
  *H01M 50/411* (2021.01)
  *H01M 4/04* (2006.01)
  *H01M 10/052* (2010.01)
  *H01M 4/02* (2006.01)

(52) U.S. Cl.
  CPC ......... *H01M 4/587* (2013.01); *H01M 10/052* (2013.01); *H01M 10/058* (2013.01); *H01M 10/0525* (2013.01); *H01M 10/0583* (2013.01); *H01M 50/109* (2021.01); *H01M 50/403* (2021.01); *H01M 50/411* (2021.01); *H01M 50/417* (2021.01); *H01M 50/463* (2021.01); *H01M 50/534* (2021.01); *H01M 2004/027* (2013.01)

(56) References Cited

U.S. PATENT DOCUMENTS

| | | |
|---|---|---|
| 6,495,283 B1 | 12/2002 | Yoon et al. |
| 7,618,748 B2 | 11/2009 | Nathan et al. |
| 8,951,694 B2 | 2/2015 | Ben-Youcef et al. |
| 9,559,349 B2 | 1/2017 | Braun et al. |
| 2007/0134549 A1 | 6/2007 | Nathan et al. |
| 2008/0188618 A1 | 8/2008 | Greving et al. |
| 2008/0203972 A1 | 8/2008 | Sather et al. |
| 2009/0148764 A1 | 6/2009 | Kwak et al. |
| 2009/0170001 A1 | 7/2009 | Roozeboom et al. |
| 2010/0216031 A1 | 8/2010 | Machida |
| 2010/0255376 A1 | 10/2010 | Park et al. |
| 2011/0027648 A1 | 2/2011 | Rolison et al. |
| 2011/0091776 A1 | 4/2011 | Rubino et al. |
| 2013/0075364 A1 | 3/2013 | Wang et al. |
| 2013/0266856 A1 | 10/2013 | Ryhanen et al. |
| 2014/0087227 A1 | 3/2014 | Shih et al. |
| 2014/0272537 A1* | 9/2014 | Kretschmar ........ H01M 50/538 429/149 |
| 2014/0315061 A1 | 10/2014 | Wang |
| 2015/0076741 A1 | 3/2015 | Yamada et al. |
| 2015/0147641 A1 | 5/2015 | Elhamid et al. |
| 2015/0280289 A1 | 10/2015 | Karlovsky et al. |
| 2015/0323811 A1 | 11/2015 | Flitsch et al. |
| 2016/0038884 A1 | 2/2016 | Hikita et al. |
| 2016/0133985 A1 | 5/2016 | Harayama |
| 2016/0204473 A1 | 7/2016 | Lindstrom et al. |
| 2016/0285133 A1 | 9/2016 | Baumeister et al. |

FOREIGN PATENT DOCUMENTS

| | | |
|---|---|---|
| WO | 2016141027 A2 | 9/2016 |
| WO | 2016141027 A3 | 11/2016 |

OTHER PUBLICATIONS

Office Action received in U.S. Appl. No. 17/049,109 dated Dec. 30, 2021 (references cited herein where cited n the Information Disclosure Statement filed in U.S. Appl. No. 17/049,109 dated Aug. 19, 2021.
International Search Report Issued in PCT/US2018/023337 dated Jun. 14, 2018.
International Search Report Issued in PCT/US2018/032812 dated Jul. 19, 2018.
Varta AG, "CoinPower Rechargeable Li-Ion Button Cells Technical Handbook" May 2015, 68 pages.

* cited by examiner

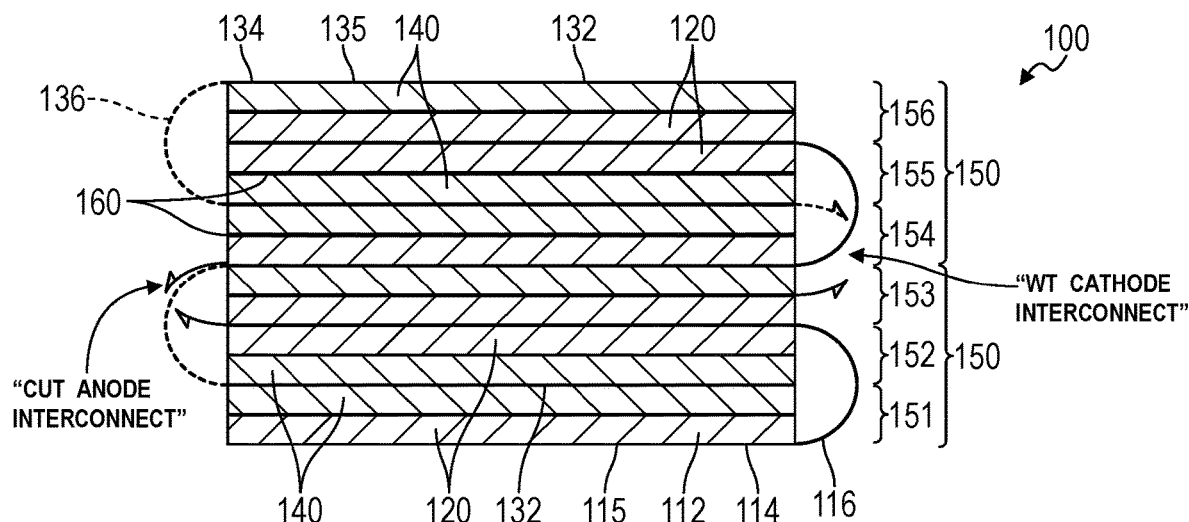
FIG. 9
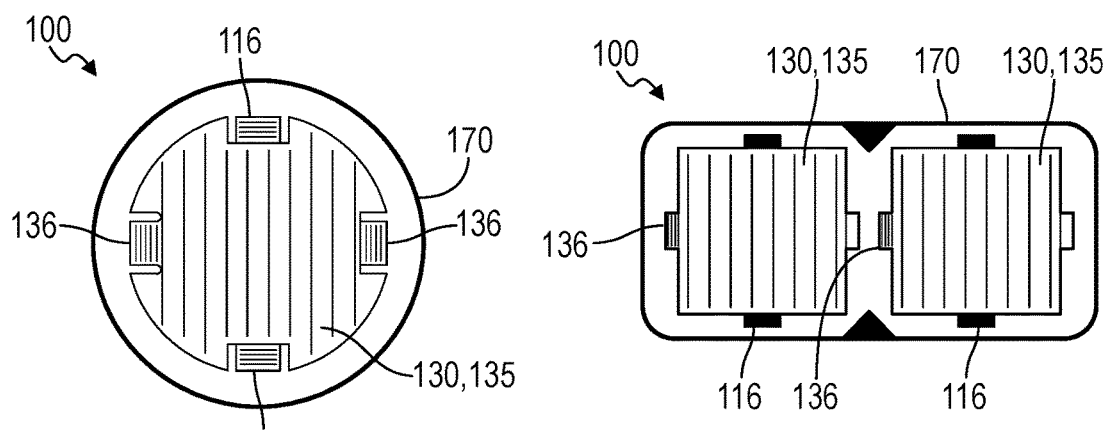
FIG. 10  FIG. 11
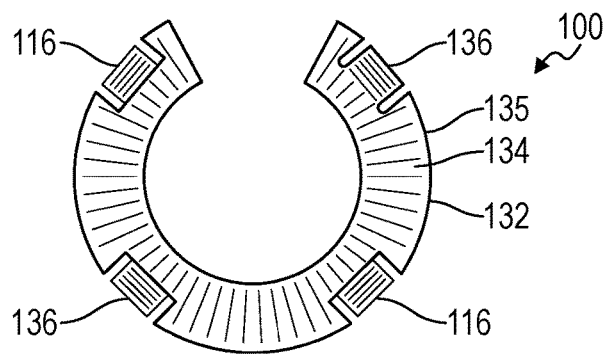
FIG. 12

THREE-DIMENSIONAL FOLDED BATTERY UNIT AND METHODS FOR MANUFACTURING THE SAME

CROSS-REFERENCE TO RELATED APPLICATIONS

This Application claims the benefit of U.S. Provisional Patent Application Nos. 63/067,773, filed on Aug. 19, 2020, and 63/135,203, filed on Jan. 8, 2021, each of which is incorporated in its entirety by this reference.

This Application is related to U.S. patent application Ser. No. 15/980,593, filed on May 15, 2018, Ser. No. 15/926,422, filed on Mar. 20, 2018, and Ser. No. 17/337,338, filed on Jun. 2, 2021, each of which is incorporated in its entirety by reference.

TECHNICAL FIELD

This invention relates generally to the field of battery technologies and more specifically to a new and useful three-dimensional folded battery unit and methods for manufacturing the same in the field of battery technologies.

BRIEF DESCRIPTION OF THE FIGURES

FIG. 9 is a schematic representation of one variation of the battery unit;

FIG. 10 is a schematic representation of one variation of the battery unit;

FIG. 11 is a schematic representation of one variation of the battery unit; and

FIG. 12 is a schematic representation of one variation of the battery unit.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Battery Unit

Figure 1A:
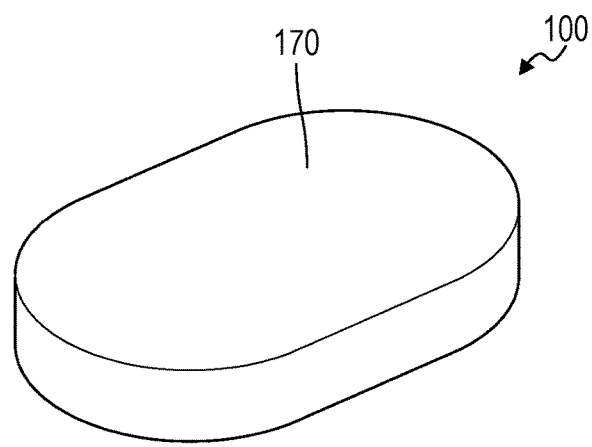
FIGS. 1A, 1B, and 1C are a schematic representation of battery unit.
Figure 1B:
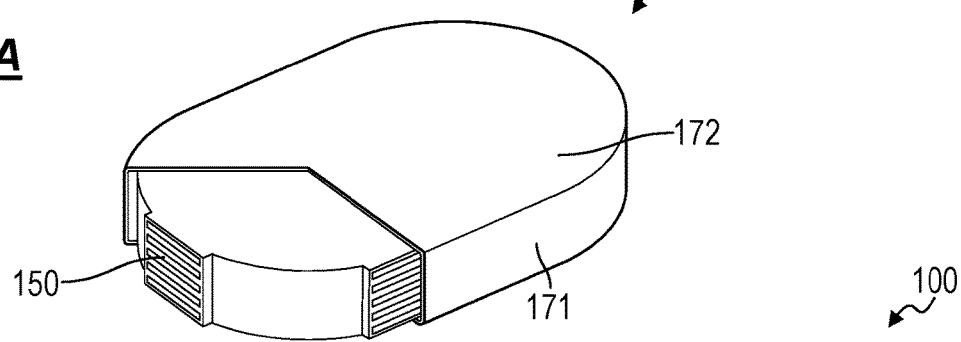
Figure 1C:
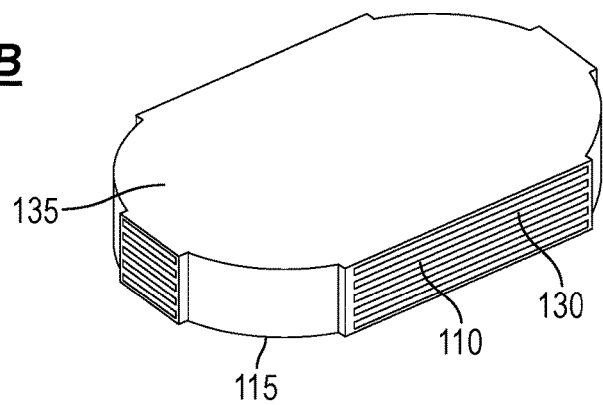

As shown in FIGS. 1A, 1B, and 1C, a battery unit 100 includes: an anode substrate 112; a cathode substrate 132; a battery housing 170; and a set of separators 160.

Figure 2:
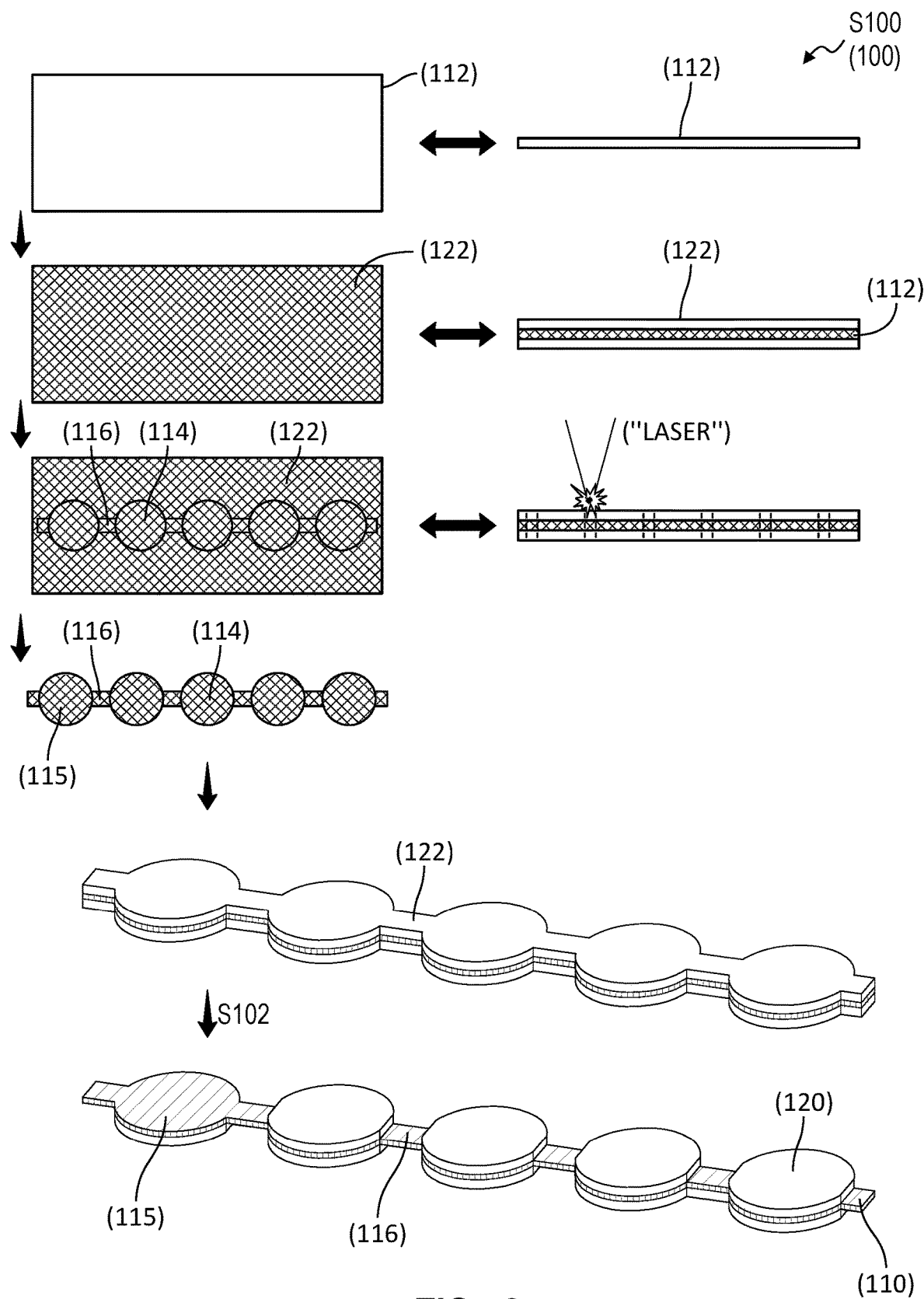
FIG. 2 is a flowchart representation of a method.
Figure 6:
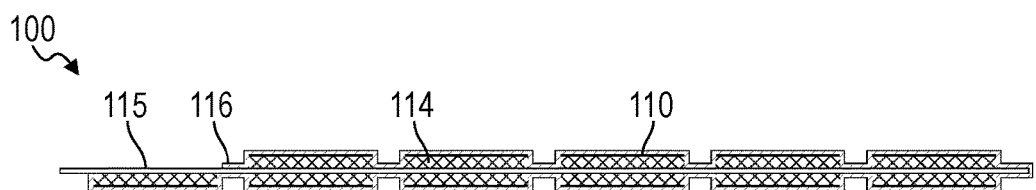
FIG. 6 is a schematic representation of one variation of the battery unit.

As shown in FIGS. 2 and 6, the anode substrate 112: includes conductive material; defines a set of anode collectors 114 including first sides coated with an anode material 122 and second sides coated with the anode material 122; defines a set of anode interconnects 116 interposed between and electrically coupling adjacent anode collectors 114 in the set of anode collectors 114; and is folded across the set of anode interconnects 116 to locate the set of anode collectors 114 in a vertical anode stack.

Figure 3:
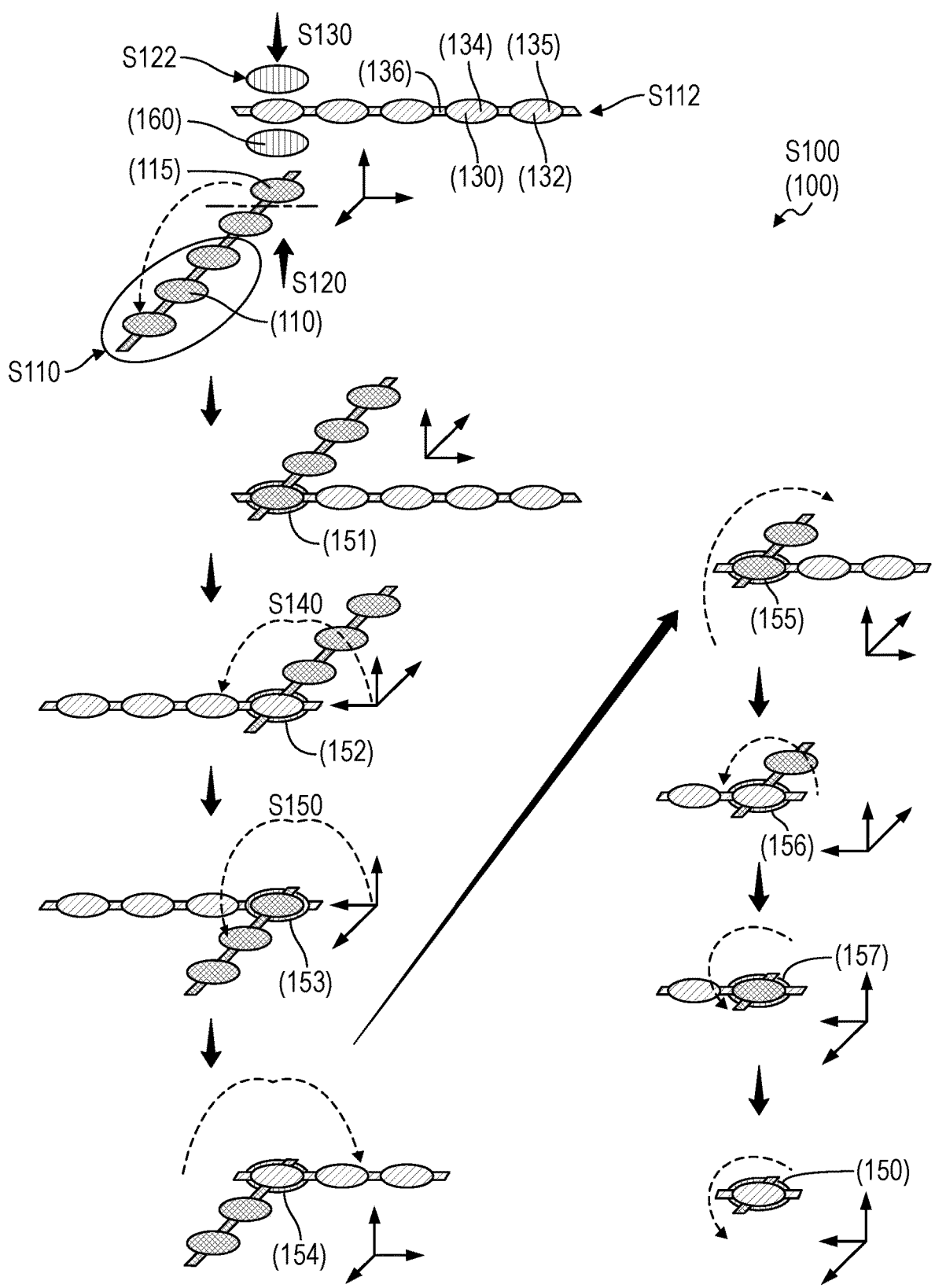
FIG. 3 is a flowchart representation of one variation of the method.

As shown in FIG. 3, the cathode substrate 132: includes conductive material; defines a set of cathode collectors 134, each cathode collector 134 in the set of cathode collectors 134 including first sides coated with a cathode material 142 and second sides coated with the cathode material 142; defines a set of cathode interconnects 136 interposed between and electrically coupling adjacent cathode collectors 134 in the set of cathode collectors 134; and is folded across the set of cathode interconnects 136 to locate the set of cathode collectors 134 in a vertical cathode stack.

Figure 4A:
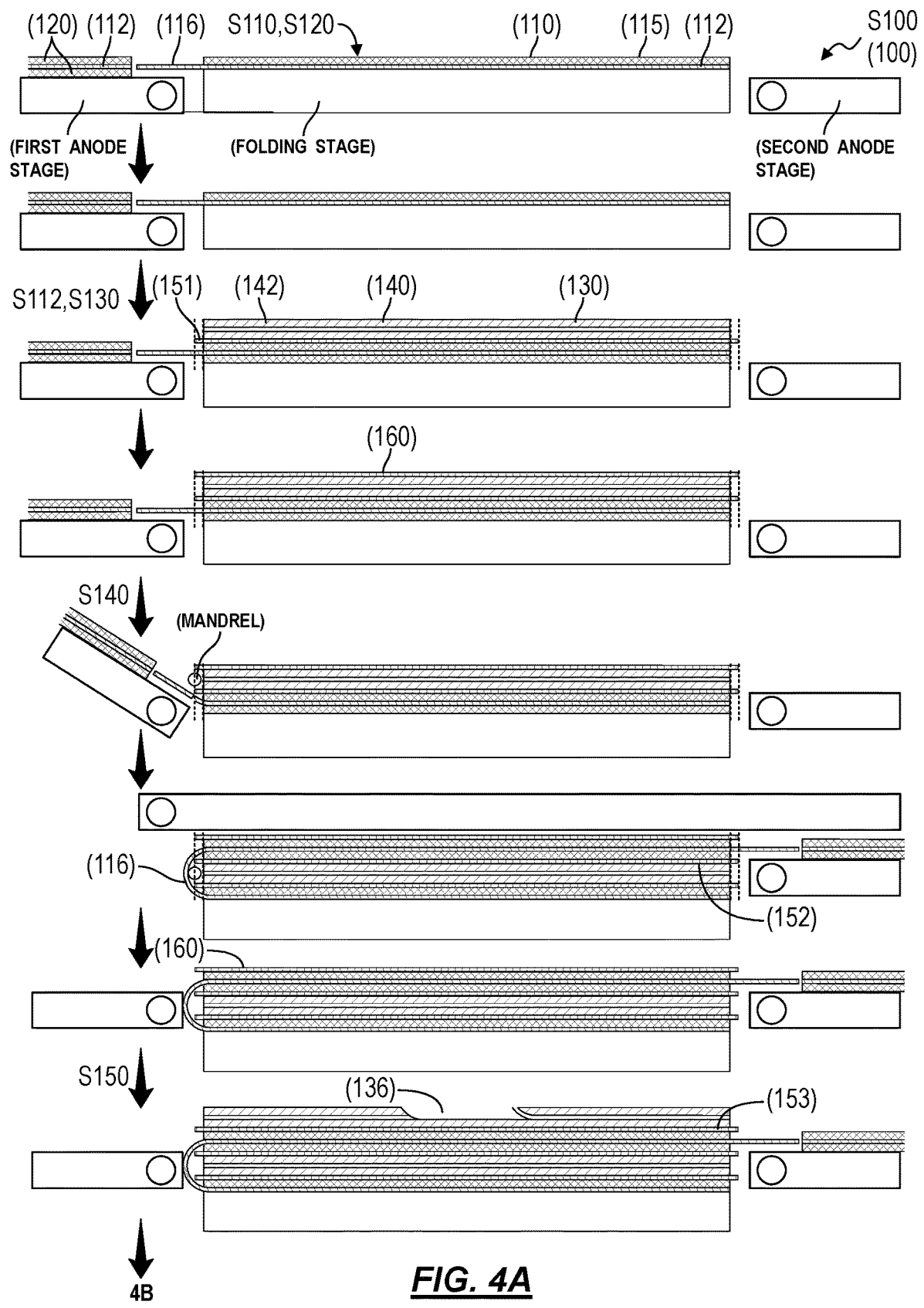
FIGS. 4A, 4B, and 4C are a flowchart representation of one variation of the method.
Figure 4B:
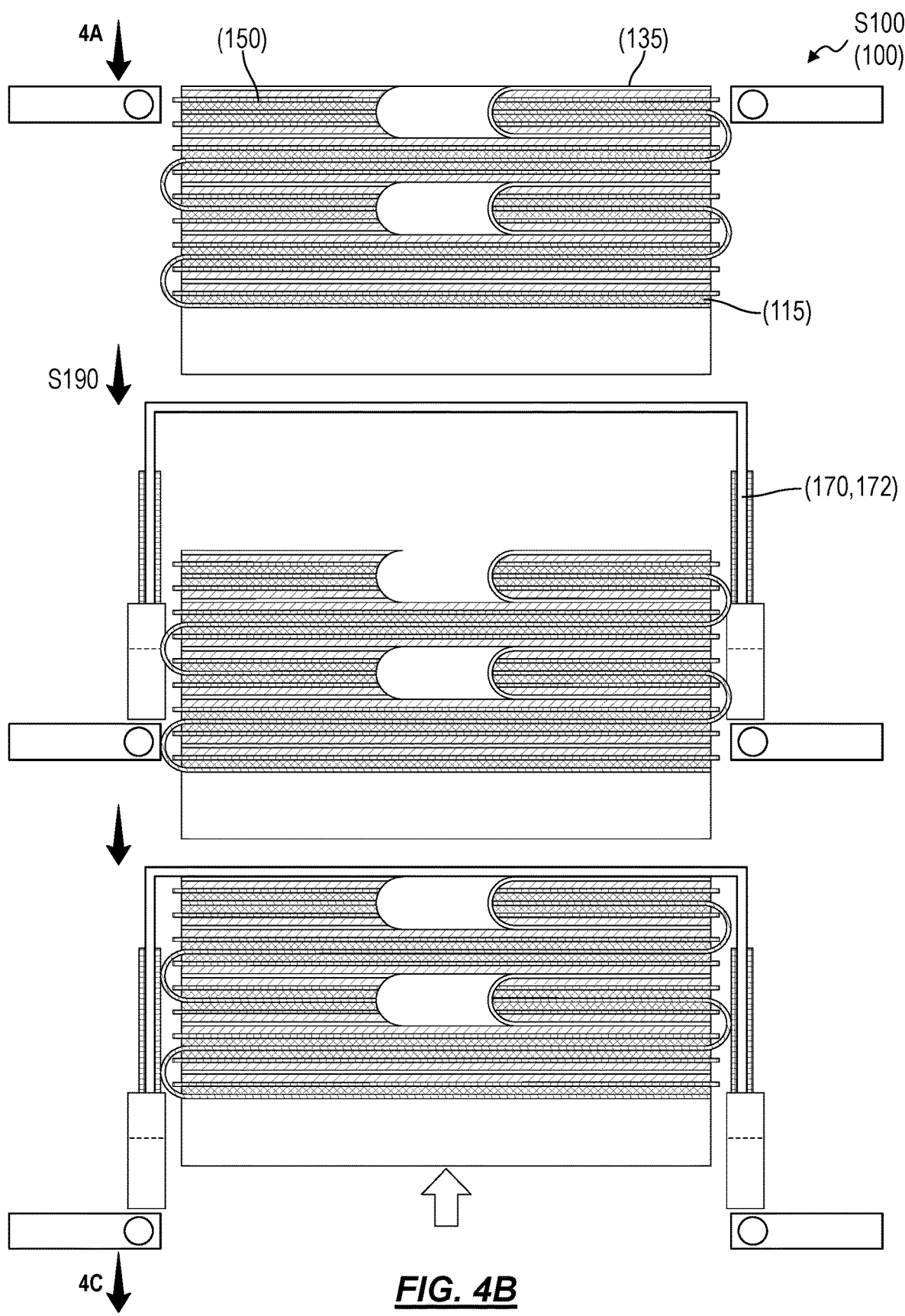
Figure 4C:
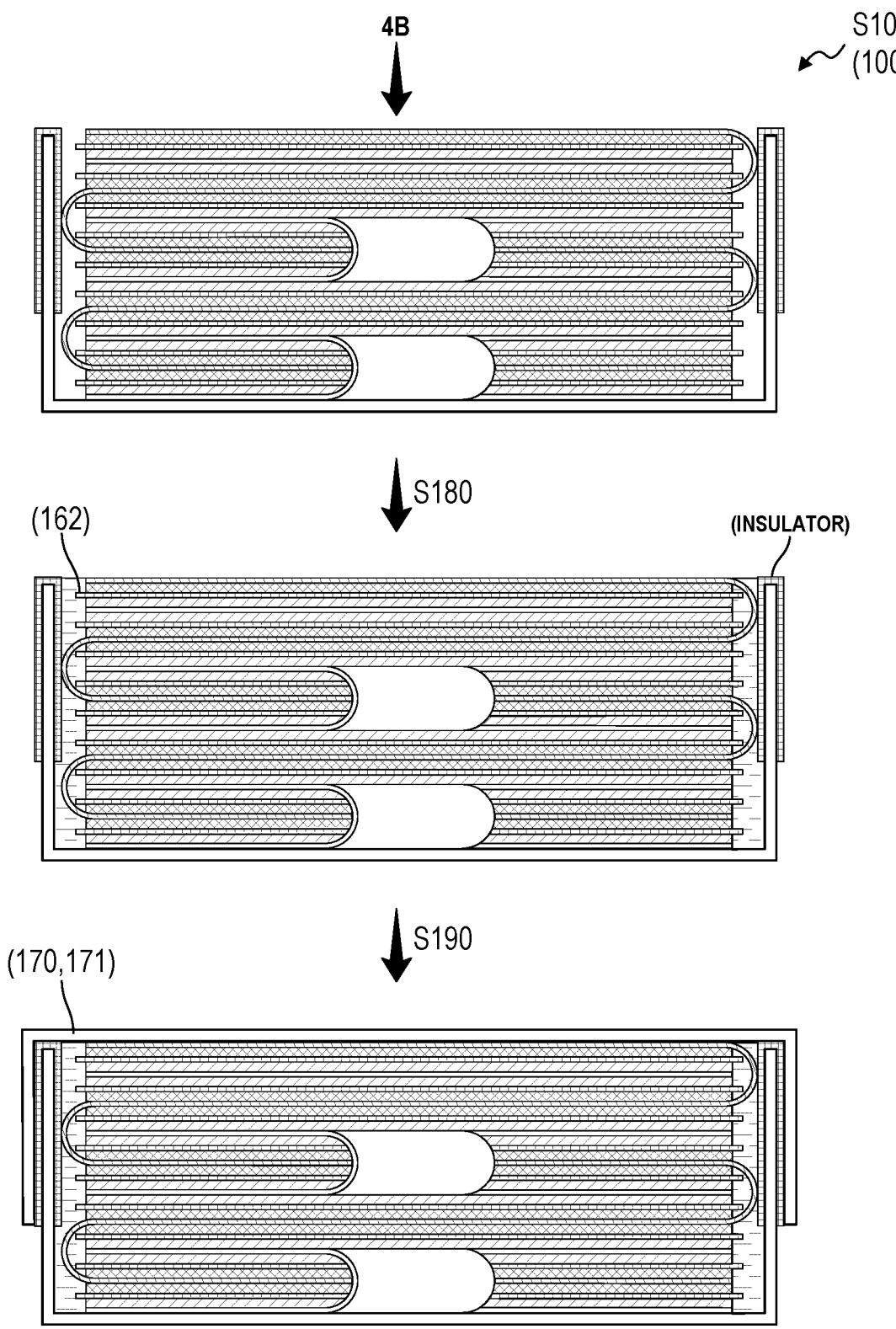

As shown in FIG. 4C, the battery housing 170 includes: a first battery housing component 171 electrically coupled to a first side of a first anode collector 115 in the set of anode collectors 114; and a second battery housing component 172 opposite the first battery housing component 171 and electrically coupled to a second side of a last cathode collector 135 in the set of cathode collectors 134. The battery housing 170 also houses the anode substrate 112 and the cathode substrate 132: with individual anode collectors 114, in the set of anode collectors 114, interposed between consecutive cathode collectors 134 in the set of cathode collectors 134; with the set of anode interconnects 116 extending around and isolated from the set of cathode collectors 134; with individual cathode collectors 134, in the set of cathode collectors 134, interposed between consecutive anode collectors 114 in the set of anode collectors 114; and with the set of cathode interconnects 136 extending around and isolated from the set of anode collectors 114.

Figure 7:
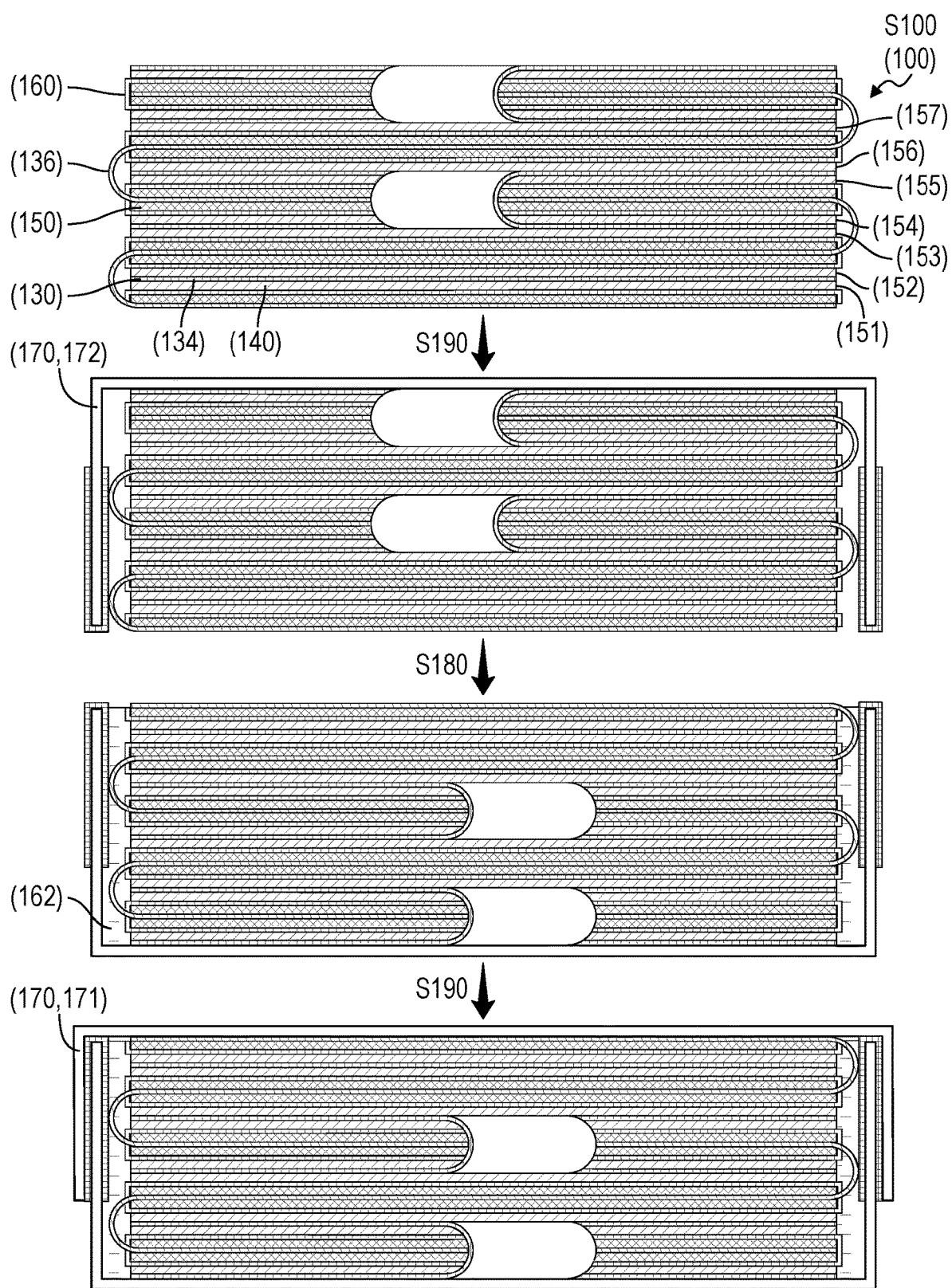
FIG. 7 is a flowchart representation of one variation of the method.

As shown in FIGS. 3 and 7, the set of separators 160: is arranged between anode collectors 114, in the set of anode collectors 114, and adjacent cathode collectors 134, in the set of cathode collectors 134, housed within the battery housing 170; and contains solvated ions 162.

One variation of the battery unit 100 shown in FIGS. 4C and 7 includes: a series of anode collectors 114; a first set of anode electrodes 120 including an anode material 122 and arranged on first sides of the series of anode collectors 114; a second set of anode electrodes 120 including the anode material 122 and arranged on second sides of the series of anode collectors 114; a set of anode interconnects 116 interposed between and electrically coupling adjacent anode collectors 114 in the series of anode collectors 114 and folded to locate the series of anode collectors 114 in a boustrophedonic anode stack; a series of cathode collectors 134; a first set of anode and cathode electrodes 120, 140 including a cathode material 142 and arranged on first sides of the series of cathode collectors 134; a second set of anode electrodes 120 including the cathode material 142 and arranged on second sides of the series of cathode collectors 134; and a set of cathode interconnects 136 interposed between and electrically coupling adjacent cathode collectors 134 in the series of cathode collectors 134 and folded to locate the series of cathode collectors 134 in a boustrophedonic cathode stack. This variation of the battery unit 100 also includes a battery housing 170: housing the boustrophedonic anode stack and the boustrophedonic cathode stack with individual cathode collectors 134 in the boustrophedonic cathode stack interposed between consecutive anode collectors 114 in the boustrophedonic anode stack; including a first battery housing component 171 electrically coupled to a first side of a first anode collector 115 in the set of anode collectors 114; and including a second battery housing component 172 opposite the first battery housing component 171 and electrically coupled to a second side of a last cathode collector 135 in the set of cathode collectors 134. This variation of the battery unit 100 further includes a set of separators 160: arranged between the first set of anode electrodes 120 and the second set of anode and cathode electrodes 120, 140; arranged between the second set of anode electrodes 120 and the first set of anode and cathode electrodes 120, 140; and containing solvated ions 162.

Another variation of the battery unit 100 shown in FIGS. 4C and 7 includes: a series of anode collectors 114; a set of anode electrodes 120 including an anode material 122 arranged on first sides and second sides of anode collectors 114 in the series of anode collectors 114; a set of anode interconnects 116 interposed between and electrically coupling adjacent anode collectors 114 in the series of anode collectors 114 and folded to locate the series of anode collectors 114 in a boustrophedonic anode stack; a series of cathode collectors 134; a set of anode and cathode electrodes 120, 140 including a cathode material 142 arranged on first sides and second sides of cathode collectors 134 in the series of cathode collectors 134; a set of cathode interconnects 136 interposed between and electrically coupling adjacent cathode collectors 134 in the series of cathode collectors 134 and folded to locate the series of cathode collectors 134 in a boustrophedonic cathode stack with cathode collectors 134, in the series of cathode collectors 134, interdigitated between anode collectors 114, in the series of anode collectors 114; and a set of separators 160 arranged between the set of anode electrodes 120 and the set of anode and cathode electrodes 120, 140 and transporting solvated ions 162 between the set of anode electrodes 120 and the set of anode and cathode electrodes 120, 140.

1.1 Applications

Generally, the battery unit 100 includes: an anode assembly 110 containing a series of anode collectors 114 connected by anode interconnects 116 (or "bridges"), coated with anode material 122 to form anode electrodes 120, and coated with separator material to traffic electrolytes (e.g., solvated ions 162) between anode electrodes 120 and anode and cathode electrodes 120, 140; a cathode assembly 130 containing a series of cathode collectors 134 connected by cathode interconnects 136 and coated with cathode material 142 to form anode and cathode electrodes 120, 140; and a battery housing 170 that contains the anode assembly 110 and the cathode assembly 130. The anode assembly no and the cathode assembly 130 are folded across the anode and cathode interconnects 136 to form boustrophedonic anode and cathode stacks that are interdigitated to construct a column of battery cells connected in parallel between terminals of the battery housing 170 by the anode and cathode interconnects 136, wherein each battery cell contains: one anode electrode 120 arranged across one side of an anode collector 114; one cathode electrode 140 arranged across one side of an adjacent cathode collector 134; and one separator 160 interposed between these anode and cathode electrodes 120, 140.

In particular, the anode assembly 110 and the cathode assembly 130 can be folded to form a three-dimensional battery containing a stack of battery cells connected in parallel. Each battery cell contains a thin, planar anode electrode 120 extending laterally and longitudinally across an anode collector 114, approximately parallel to a bottom of battery housing 170 (e.g., a positive terminal of the battery housing 170 and a top of battery housing 170 (e.g., a negative terminal of the battery housing 170). Similarly, each battery cell contains a thin, planar cathode electrode 140 extending laterally and longitudinally across a cathode collector 134, approximately parallel to the bottom and top of battery housing 170.

However, before the anode and cathode assemblies no, 130 are folded to form the folded battery cell stack 150, the anode assembly 110 can be fabricated on a "2.5-dimensional" structure by: cutting a unitary anode substrate 112—defining a series of anode collectors 114 connected by a set of anode interconnects 116—from a singular tape, sheet, or film of anode substrate material; coating both sides of these anode collectors 114 with anode material 122 while the unitary anode substrate 112 remains flat (i.e., unfolded) to form thin-film anode electrodes 120 on both sides of these anode collectors 114; and then encapsulating the anode electrodes 120 and anode interconnects 116 with separator material. Similarly, before the anode and cathode assemblies no, 130 are folded to form the folded battery cell stack 150, the cathode assembly 130 can be fabricated on a "2.5-dimensional" structure by: cutting a unitary cathode substrate 132—defining a series of cathode collectors 134 connected by a set of cathode interconnects 136—from a singular tape, sheet, or film of cathode substrate material; and coating both sides of these cathode collectors 134 with cathode material 142 while the unitary cathode substrate 132 remains flat (i.e., unfolded) to form thin-film anode and cathode electrodes 120, 140 on both sides of these cathode collectors 134.

Once the anode assembly 110 is folded with the cathode assembly 130 to form a folded battery cell stack 150, the separator 160 can thus function to both: shield the anode interconnects 116 from shorting against cathode interconnects 136 and the battery housing 170; and transport ions between anode and cathode electrodes 120, 140 within each battery cell. The 2.5-dimensional anode and cathode assemblies 110, 130 can thus be fabricated with one- or two-dimensional fabrication techniques, such as: die- or laser-cutting (e.g., to cut the anode collectors 114 and anode interconnects 116 from the tape or sheet of anode substrate material); and spray-coating, dip-coating, or vapor deposition (e.g., to fabricate anode electrodes 120 and separators 160 across the anode collectors 114 and anode interconnects 116). The 2.5-dimensional anode and cathode assemblies 110, 130 can then be folded—such as according to the method S100 described below—to interdigitate anode collectors 114, separators 160, and cathode collectors 134 and to thus form a stack of individual battery cells connected in parallel.

Furthermore, because the anode and cathode assemblies 110, 130 contain thin, planar, 2.5-dimensional anode and cathode electrodes 120, 140 that extend approximately parallel to the terminals of the battery housing 170, the anode and cathode assembly 130 structures can be fabricated with the same methods and techniques but with different anode and cathode collector 134 footprints (i.e., two-dimensional plan geometries) to enable anode and cathode assembly 130 pairs to be folded into battery cell stacks of various footprints configured for stuffing into battery housings of various widths and geometries, such as: a 16-millimeter-diameter cylindrical coin cell battery; a 12.5-millimeter-diameter cylindrical coin cell battery; a 10-millimeter-diameter cylindrical coin cell battery; a 9.5-millimeter-diameter cylindrical coin cell battery; a square battery; a "squircle-shaped" battery; a rectangular battery; or a lozenge battery; etc.

Similarly, anode collectors 114 and cathode collectors 134 can be added to anode and cathode assemblies 110, 130 to increase the total thickness of a folded battery cell stack 150 when these anode and cathode assemblies 110, 130 are assembled—and vice versa—thereby enabling anode and cathode assembly 130 pairs to be folded into battery cell stacks of different quantities of battery cells configured for stuffing into battery housings of various heights, such as: 3.2 millimeters; 2.5 millimeters; 1.6 millimeters; or 1.2 millimeters.

Therefore, an anode assembly 110 and a cathode assembly 130 can be fabricated and assembled according to same processes, materials, and structures described below to form a battery unit 100 of any: width (i.e., parallel to a positive or negative terminal of the battery unit 100); thickness (e.g., less than half of the width); and footprint (e.g., round, square, squircle, or lozenge).

1.2 Anode Assembly

Figure 5:
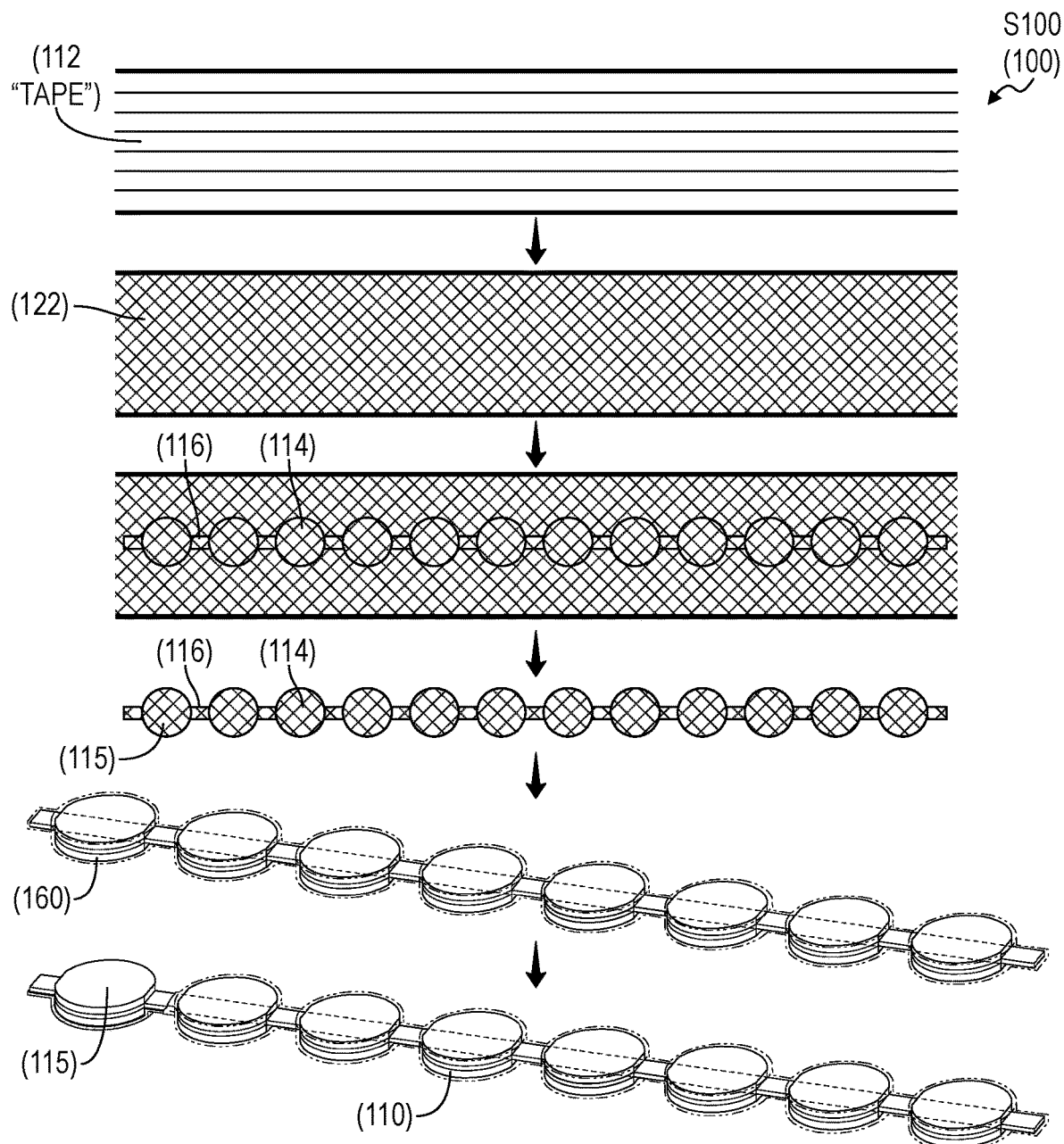
FIG. 5 is a flowchart representation of one variation of the method.

As shown in FIGS. 2 and 5, the anode assembly 110 includes an anode substrate 112 that: includes a conductive material; defines a set of anode collectors 114; and defines a set of anode interconnects 116 interposed between and electrically coupling adjacent anode collectors 114 in the set of anode collectors 114. The set of anode collectors 114 include: first sides coated with an anode material 122 that forms anode electrodes 120 on the first side of the anode substrate 112; and second sides coated with the anode material 122 that similarly forms anode electrodes 120 on the second side of the anode substrate 112. This resulting anode assembly 110 is later folded across the set of anode interconnects 116 to locate the set of anode collectors 114 in a vertical anode stack that is interdigitated with a similar cathode assembly 130 to form a folded battery cell stack 150.

In one implementation, the anode substrate 112 includes a metallic (e.g., copper, stainless steel) foil or mesh; and the anode material 122 includes graphite or silicon, such as formed by slurry lamination or vapor deposition over the anode substrate 112, as described below. For example, the set of anode collectors 114 and the set of anode interconnects 116 can define a unitary conductive layer that is cut from a singular sheet or tape of conductive anode substrate material to form the set of anode collectors 114 that are arranged in a single row.

Furthermore and as described below, a first anode collector 115—in the set of anode collectors 114 in the anode assembly 110—can include a first side: excluding the anode material 122 (i.e., excluding an anode electrode 120); excluding separator material; and configured to contact a base of the first battery housing component 171 (hereinafter an "anode-side battery housing component 171") once the folded battery cell stack 150 is loaded into a battery housing 170. The first anode collector 115 can also include a second side: coated with the anode material 122 that forms a first anode electrode 120; encapsulated with the separator 160; and facing a first side of a first cathode collector 135, in the cathode assembly 130, to form a first battery cell 151 in the folded battery cell stack 150.

(In one variation, the anode assembly 110 includes: a first anode collector that is fully uncoated and is welded (e.g., via resistance or laser welding) to the inside of the anode-side battery housing component 171 described below; a second anode collector defining a second side that is uncoated (or "bare") and a first side coated with anode material that forms a first anode electrode and separator material that forms a first separator; and a first anode interconnect extending between the first and second anode collectors. During assembly, the first side of the first anode collector is welded to the inside of the anode-side battery housing component 171, and the first anode interconnect is then folded to bring the second side of the second anode collector into direct contact with the second side of the first anode collector. Thus, in this variation, the first side of the first anode collector can be rigidly connected to the anode-side battery housing component 171 without heating, warping, or otherwise damaging the first anode electrode and the first separator.)

Similarly, each anode interconnect 116, in the set of anode interconnects 116, can define a first side excluding the anode material 122 and a second side excluding the anode material 122, thereby: enabling the anode interconnect 116 to bend during assembly of the folded battery cell stack 150 with no or minimal damage to the anode interconnect 116; and avoiding loss of (brittle) anode material 122 that may otherwise break off of the anode interconnect 116 and short the anode interconnect 116 to a wall of the battery housing 170 or to an adjacent cathode interconnect 136.

1.3 Cathode Assembly

As shown in FIG. 3, the cathode assembly 130 includes a cathode substrate 132 that: includes a conductive material; defines a set of cathode collectors 134; and defines a set of cathode interconnects 136 interposed between and electrically coupling adjacent cathode collectors 134 in the set of cathode collectors 134. The set of cathode collectors 134 include: first sides coated with a cathode material 142 that forms anode and cathode electrodes 120, 140 on the first side of the cathode substrate 132; and second sides coated with the cathode material 142 that similarly forms anode and cathode electrodes 120, 140 on the second side of the cathode substrate 132. This resulting cathode assembly 130 is later folded across the set of cathode interconnects 136 to locate the set of cathode collectors 134 in a vertical cathode stack that is interdigitated with a similar anode assembly 110 to form a folded battery cell stack 150.

In one implementation, the cathode substrate 132 includes a metallic (e.g., aluminum, stainless steel) foil or mesh; and the cathode material 142 includes lithium cobalt oxide (or "LCO") or lithium nickel manganese cobalt oxide (or "NMC"), such as formed by slurry lamination or vapor deposition, as described below. For example, the set of cathode collectors 134 and the set of cathode interconnects 136 can define a unitary conductive layer that is cut from a singular sheet or tape of conductive cathode substrate material to form the set of cathode collectors 134 that are arranged in a single row.

Furthermore and as described below, a last cathode collector 135—in the set of cathode collectors 134 in the cathode assembly 130—can include a second side: excluding the cathode material 142 (i.e., excluding a cathode electrode 140); and configured to contact an interior surface of the second battery housing component 172 (hereinafter a "cathode-side battery housing component 172") once the folded battery cell stack 150 is loaded into a battery housing 170. The last cathode collector 135 can also include a first side: coated with the cathode material 142 that forms a last cathode electrode 140 that faces a last anode collector 114 of the anode assembly 110 to form a last battery cell in the resulting folded battery cell stack 150.

(In one variation, the cathode assembly 130 includes: a last cathode collector that is fully uncoated and is welded (e.g., via resistance or laser welding) to the inside of the cathode-side battery housing component 172 described below; a penultimate cathode collector defining a first side that is uncoated (or "bare") and a second side coated with cathode material that forms a last cathode electrode; and a last cathode interconnect extending between the last and penultimate cathode collectors. During a last step of assembly of the battery, the second side of the last cathode collector is welded to the inside of the cathode-side battery housing component 172, and the last cathode interconnect is then folded to bring the cathode-side battery housing component 171 over the folded battery cell stack 150, thereby bringing the first side of last cathode collector into direct contact with the first side of the penultimate cathode collector. Thus, in this variation, the second side of the last cathode collector can be rigidly connected to the cathode-side battery housing component 172 without heating, warping, or otherwise damaging the last cathode electrode and the last separator.)

1.4 Separator

The battery unit 100 also includes separator material: interposed between an anode electrode 120 on an anode collector 114, in the anode assembly 110, and a cathode electrode 140 on an adjacent cathode collector 134 in the cathode assembly 130. Generally, the separator material forms a permeable membrane: between the anode and cathode electrodes 120, 140 within each battery cell within the battery unit 100; and configured to transport ions between the anode and cathode electrodes 120, 140 when the battery unit 100 is charged and discharged.

1.4.1 Coated Separator

In one implementation described below and shown in FIGS. 5, 6, and 7, the separator material includes: a first solvent; a first monomer miscible (e.g., dissolved) in the first solvent; a secondary polymer immiscible in the first solvent but miscible in a second solvent; and/or a catalyst that polymerizes the monomer. The separator material is sprayed, deposited, dip-coated, or otherwise applied across all surfaces of the anode assembly 110 (other than the first side of the first anode collector 115) after fabrication of the anode electrodes 120 on the anode collectors 114. The separator material is then dried, and the monomer is polymerized, such as by activating the catalyst by heating the separator material or exposing the separator material to ultraviolet (or "UV") radiation. The monomer entraps the secondary polymer in an open-celled network during polymerization. The resulting separator 160 is non-conductive and is washed or rinsed in the second solvent to dissolve the secondary polymer out of the separator 160, thereby rendering an open-celled network of pores sized to transport ions through the separator 160 and between the adjacent anode and cathode electrodes 120, 140.

In this implementation, the separator 160 can also coat the anode interconnects 116 and can therefore function to shield the anode interconnects 116 from shorting against other cathode interconnects 136, cathode collectors 134, or an interior surface of the battery housing 170.

Alternatively, the separator 160 can form an open-celled network of pores directly when dried and/or polymerized across the anode collectors 114 and anode interconnects 116. Therefore, in this implementation, a separator 160 can include a slurry: deposited onto a side of an anode collector 114 in the anode assembly 110; cured across the side of the anode collector 114 prior to folding of the set of anode interconnects 116; and wetted with solvent and solvated ions 162, such as following insertion of the anode substrate 112 and the cathode substrate 132 into the battery housing 170.

1.4.2 Prefabricated Separator

In one variation described below and shown in FIGS. 3, 4A, 4B, 4C, 8A, 8B, 8C, and 8C, the battery unit 100 includes prefabricated separators 160: interposed between anode and cathode electrodes 120, 140; and that extend beyond perimeters of the anode and cathode electrodes 120, 140 to prevent direct contact between the anode and cathode electrodes 120, 140 once folded and installed in the battery housing 170.

For example, prefabricated separators 160 can be cut from a porous tape or sheet membrane, such as to diameters 50 microns greater than the diameters of the anode and cathode collectors and anode and cathode electrodes in order to prevent exposed edges of the anode and cathode collectors and edges of the anode and cathode electrodes from contacting. A prefabricated separator 160 can then be located over each anode and cathode electrodes 120, 140 as the anode and cathode assemblies 110, 130 are folded to form the folded battery cell stack 150, as described below. For example, each prefabricated separator 160 can include a polypropylene disk defining a porous (e.g., nanoporous) structure that is saturated with solvated ions 162 prior to completion of the battery unit 100.

Therefore, in this variation, the battery unit 100 can include a set of preformed non-conductive coupons inserted between: first sides of anode collectors 114 in the set of anode collectors 114 and second sides of cathode collectors 134 in the set of cathode collectors 134; and second sides of anode collectors 114 in the set of anode collectors 114 and first sides of cathode collectors 134 in the set of cathode collectors 134.

1.5 Interconnect Geometry

As shown in FIGS. 2, 5, and 6, each anode collector 114—in the set of anode collectors 114 in the anode assembly 110—defines a first width and a first length. Each anode interconnect 116—in the set of anode interconnects 116 in the anode assembly 110—can define: a second width less than 20% of the first width; and a second length less than 20% of the first length. Furthermore, in this example: each anode collector 114 can define an anode collector 114 thickness and include a second side coated with the anode material 122 that forms an anode electrode 120 of an anode electrode thickness; each cathode collector 134 can define a cathode collector 134 thickness and include a first side coated with the cathode material 142 that forms a cathode electrode 140 of a cathode electrode thickness; and each separator 160 can define a separator 160 thickness. Accordingly, each anode interconnect 116 can be folded over a bend radius approximating a sum of: half of the anode collector 114 thickness; the anode electrode thickness; the separator 160 thickness; the cathode electrode thickness; and half of the cathode collector 134 thickness.

In one example, each anode collector 114: defines a circular geometry with a diameter of 9.5-millimeters; defines a thickness of 15 microns; is coated with anode electrodes 120 100 microns thick; and is encapsulated with separator 160 40 microns thick. Each anode interconnect 116 defines a width of 3.0 millimeters and defines a length of 750 microns between adjacent anode collectors 114 in the anode assembly 110. In this example, each cathode collector 134 similarly: defines a circular geometry with a diameter of 9.5-millimeters; defines a thickness of 15 microns; and is coated with anode and cathode electrodes 120, 140 that are 100 microns thick.

Once the anode and cathode assemblies 110, 130 are folded, the thickness of each battery cell (i.e., the distance between the center of an anode collector 114 to the center of a cathode collector 134 in the same battery cell) is 260 microns. The bend radius of each anode interconnect 116 can therefore approximate 130 microns, or approximately ten times the thickness of the anode interconnects 116. Each anode interconnect 116 can also extend outwardly from a stack of anode collectors 114 by approximately 500 microns.

Similarly, the bend radius of each cathode interconnect 136 can therefore approximate 130 microns, or approximately ten times the thickness of the cathode interconnects 136. Each cathode interconnect 136 can also extend outwardly from a stack of cathode collectors 134 by approximately 500 microns—and radially offset (e.g., by 90°) from the anode interconnects 116.

The total effect width of the folded battery cell stack 150 can therefore approximate 10.5 millimeters and can be loaded into a 12.5-millimeter-diameter cylindrical coin cell battery.

1.6 Interdigitated Anode and Cathode Substrates

As described below and shown in FIGS. 3, 4A, 4B, 4C, 8A, 8B, 8C, and 8D, the anode substrate 112 is folded across the set of anode interconnects 116 and the cathode substrate 132 is folded across the set of cathode interconnects 136 to interdigitate individual anode collectors 114, in the set of anode collectors 114, between adjacent cathode collectors 134, in the set of cathode collectors 134.

In particular, the anode assembly 110 can be folded to form a boustrophedonic anode stack, and the cathode assembly 130 can be folded to form a boustrophedonic cathode stack with cathode collectors 134 interleaved between anode collectors 114 of the boustrophedonic anode stack. More specially, the boustrophedonic anode stack and the boustrophedonic cathode stack are interdigitated: with the set of anode interconnects 116 extending outwardly from the series of anode collectors 114 and extending around and isolated from the set of cathode collectors 134; and with the set of cathode interconnects 136 extending outwardly from the series of cathode collectors 134 orthogonal to the set of anode interconnects 116 and extending around and isolated from the set of anode collectors 114.

A first anode collector 115 in the set of anode collectors 114, a first anode electrode 120 arranged on a second side of the first anode collector 115, a first cathode collector 135 in the set of cathode collectors 134, a first cathode electrode 140 of cathode material 142 arranged on a first side of the first cathode collector 135, and a first separator 160 interposed between the first anode electrode 120 and the first cathode electrode 140 thus cooperate to form a first battery cell 151 in a set of battery cells. Similarly, a second anode collector 114 in the set of anode collectors 114, a second anode electrode 120 arranged on a first side of the second anode collector 114, the first cathode collector 135, a second cathode electrode 140 of cathode material 142 arranged on a second side of the first cathode collector 135, and a second separator 160 interposed between the second anode electrode 120 and the second cathode electrode 140 cooperate to form a second battery cell 152 in the set of battery cells. The set of battery cells are connected in parallel between the anode-side and cathode-side battery housing components 171, 172 by the anode and cathode interconnects 136.

1.6 Battery Housing

As shown in FIGS. 4C and 7, the battery unit 100 further includes a battery housing 170: configured to house the folded battery cell stack 150; and defining positive and negative terminals coupled to the first anode collector 115 and the last cathode collector 135, respectively.

In one example, the set of anode collectors 114 and the set of anode interconnects 116 of the anode assembly 110 include a first unitary conductive layer (i.e., the anode substrate 112) cut to form the set of anode collectors 114 arranged in a single row. Each anode collector 114 in the set of anode collectors 114: defines a first width; and is offset from an adjacent anode collector 114, in the set of anode collectors 114, by an anode pitch distance greater than the first width. Similarly, the set of cathode collectors 134 and the set of cathode interconnects 136 include a second unitary conductive layer (i.e., the cathode substrate 132) cut to form the set of cathode collectors 134 arranged in a single cathode row. Each cathode collector 134 in the set of cathode collectors 134: defines a second width (e.g., equal to or slightly less than the first width of the anode collectors 114); and is offset from an adjacent cathode collector 134, in the set of cathode collectors 134, by a cathode pitch distance greater than the second width (and equal to the anode pitch distance). Accordingly, the battery housing 170 defines an internal width greater than the first width and the second width to accommodate the set of anode interconnects 116 and the set of cathode interconnects 136 that extend laterally from the anode and cathode collectors 134, respectively.

Furthermore, the battery unit 100 can include an electrical insulator located between interior walls of the battery housing 170 component and the anode and cathode interconnects 136—which extends outwardly from the anode and cathode collectors 134 in the anode and cathode stacks—to shield the sets of anode and cathode interconnects 136 from shorting against the battery housing 170. The maximum width of the folded battery cell stack 150 can therefore be less than the internal width of the battery housing 170 in order to accommodate the electrical insulator. Alternatively, the anode and cathode interconnects 136 can be coated with separator material, as described above, which can function to insulate the anode and cathode interconnects 136 from conductive interior surfaces of the battery housing 170.

1.6.1 Cylindrical Coin Cell Battery

In one implementation, the battery housing 170 defines a cylindrical coin cell housing characterized by an external housing diameter and an external housing height. In this implementation, each anode collector 114—in the set of anode collectors 114 in the anode assembly 110—can define a circular footprint of an electrode diameter less than (e.g., 10% less, 1.0 millimeter less than) the external housing diameter. Each cathode collector 134—in the set of cathode collectors 134 of the cathode assembly 130—can similarly define a circular footprint of the electrode diameter. Once the anode and cathode assembly 130 are assembled to form the folded battery cell stack 150, the folded battery cell stack 150 can be centered within the battery housing 170 such that each anode and cathode interconnect 136 are inset from the interior wall of the battery housing 170.

1.6.2 Full-Fill Collector Geometry for Cylindrical Coin Cell Battery

In another implementation shown in FIGS. 10 and 12, regions of the anode and cathode collectors 134 between the anode and cathode interconnects 136 extend beyond a circle that circumscribes the anode and cathode interconnects 136 in order to increase the total anode and cathode electrodes 120, 140 surface area within the battery unit 100.

For example, each anode collector 114 can define a truncated-circular footprint that includes: a first edge; a second edge opposite the first edge; a third edge orthogonal to the first edge; and a fourth edge opposite the third edge. In this example, each cathode collector 134 can similarly define a truncated-circular footprint that includes: a fifth edge approximately parallel to first edges of the set of anode collectors 114; a sixth edge opposite the fifth edge; a seventh edge orthogonal to the fifth edge and approximately parallel to third edges of the set of anode collectors 114; and an eighth edge opposite the seventh edge. In this example, the set of anode interconnects 116 can: extend between and electrically couple first edges and second edges of adjacent anode collectors 114 in the set of anode collectors 114; and extend around fifth edges and sixth edges of cathode collectors 134 in the set of cathode collectors 134. Similarly, the set of cathode interconnects 136 can: extend between and electrically couple seventh edges and eighth edges of adjacent cathode collectors 134 in the set of cathode collectors 134; and extend around third edges and fourth edges of anode collectors 114 in the set of anode collectors 114.

In this example, the battery housing 170 can include a coin cell housing defining an internal cylindrical section. Accordingly, the anode and cathode assemblies 110, 130—folded into the folded battery cell stack 150—can be arranged in the battery housing 170 with truncated-circular footprints of the set of anode collectors 114 approximately centered within the internal cylindrical section.

The anode and cathode collectors 134 can thus define non-circular footprints that increase a fill factor within the cylindrical coil cell battery housing 170.

1.6.3 Rectilinear Coin Cell Battery Housing

In another implementation, the battery housing 170 can include a rectangular coin cell housing defining an internal cuboid section, such as characterized by an internal housing width, an internal housing length, and an internal housing height. Accordingly, each anode collector 114 can define a rectilinear footprint that includes: a first edge of a first length less than the internal housing width; a second edge opposite the first edge; a third edge orthogonal to the first edge and of a second length greater than the first length and less than the internal housing length; and a fourth edge opposite the third edge. Similarly, each cathode collector can define a rectilinear footprint that includes: a fifth edge of the first length and approximately parallel to first edges of the set of anode collectors 114; a sixth edge opposite the fifth edge; a seventh edge of the second length, orthogonal to the fifth edge, and approximately parallel to third edges of the set of anode collectors 114; and an eighth edge opposite the seventh edge.

Furthermore, the set of anode interconnects 116 can: extend between and electrically couple first edges and second edges of adjacent anode collectors 114 in the set of anode collectors 114; and extend around fifth edges and sixth edges of cathode collectors 134 in the set of cathode collectors 134. Similarly, the set of cathode interconnects 136 can: extend between and electrically couple seventh edges and eighth edges of adjacent cathode collectors 134 in the set of cathode collectors 134; and extend around third edges and fourth edges of anode collectors 114 in the set of anode collectors 114.

Thus, in this implementation, the anode and cathode collectors 134—and the anode and cathode electrodes 120, 140 arranged on these collectors—can define rectangular footprints with widths that differ from their lengths.

Alternatively, in one variation, the battery unit 100 includes multiple (e.g., two) folded battery cell stacks 150 of similar heights, defining similar (approximately) square footprints, located side-by-side within the battery housing 170, and thus connected in parallel to the terminals of the battery housing 170. Thus, in this variation, the assembly system described below can fold anode and cathode assemblies 110, 130 of defining widths and lengths of approximately the same dimension, which may reduce strain on—and damage to—anode and cathode interconnects 136 and anode and cathode electrodes 120, 140 during a folding cycle.

1.6.4 Other Battery Housing Geometries

However, the battery housing 170 can define any other shape, geometry, or footprint, such as: a cylindrical coin cell battery housing 170 (shown in FIG. 10); a flat square or rectangular battery housing 170; a truncated-circular (or "squircle") battery housing 170 (shown in FIG. 11); a toroidal battery housing 170 (shown in FIG. 12); or a lozenge battery housing 170; etc. Accordingly, the anode and cathode collectors 134—and the anode and cathode electrodes 120, 140 fabricated thereover—can define similar circular, square, rectilinear, toroidal, lozenge, or other corresponding geometries configured to locate within the battery housing 170.

2. Method

As shown in FIG. 3, a method S100 for fabricating a battery unit 100 includes, by a folding station: receiving an anode assembly 110 including a series of anode collectors 114 connected by a set of anode interconnects 116 in Block S110; receiving a cathode assembly 130 including a series of cathode collectors 134 connected by a set of cathode interconnects 136 in Block S112; locating a first anode collector 115, in the series of anode collectors 114, over a folding stage in Block S120, a first side of the first anode collector 115 facing the folding stage, and a second side of the first anode collector 115 coated with a first anode electrode 120 and a first separator 160; locating a first cathode collector 135, in the series of cathode collectors 134, over the first anode collector 115 in Block S130, a first side of the first cathode collector 135 coated with a first cathode electrode 140 in contact with the first separator 160, and a second side of the first cathode collector 135 coated with a second cathode electrode 140; folding the anode assembly 110 along a first anode interconnect 116, in the set of anode interconnects 116 and interposed between the first anode collector 115 and a second anode collector 114 in the series of anode collectors 114, in Block S140 to locate the second anode collector 114 over the first cathode collector 135, a first side of the second anode collector 114 coated with a second anode electrode 120 and a second separator 160 in contact with the second cathode electrode 140, and a second side of the second anode collector 114 coated with a third anode electrode 120 and a third separator 160; folding the cathode assembly 130 along a first cathode interconnect 136, in the set of cathode interconnects 136 and interposed between the first cathode collector 135 and a second cathode collector 134 in the series of cathode collectors 134, in Block S150 to locate the second cathode collector 134 over the second anode collector 114, a first side of the second cathode collector 134 coated with a third cathode electrode 140 in contact with the third separator 160, and a second side of the second cathode collector 134 coated with a fourth cathode electrode 140; wetting the first separator 160, the second separator 160, and the third separator 160 with solvated ions 162 in Block S180; and loading the anode assembly 110 and the cathode assembly 130 into a battery housing 170 in Block S190 with the first side of the first anode collector 115 in contact with a first battery terminal of the battery housing 170 and with a second side of a last cathode collector 135, the series of cathode collectors 134, in contact with a second battery terminal of the battery housing 170.

One variation of the method S100 shown in FIG. 3 further includes: folding the anode assembly 110 along a second anode interconnect 116, in the set of anode interconnects 116 and interposed between the second anode collector 114 and a third anode collector 114 in the series of anode collectors 114, to locate the third anode collector 114 over the second cathode collector 134 in Block S140, a first side of the third anode collector 114 coated with a fourth anode electrode 120 and a fourth separator 160 in contact with the fourth cathode electrode 140 (to form a fourth battery cell 154), and a second side of the fourth anode collector 114 coated with a fifth anode electrode 120 and a fifth separator 160; folding the cathode assembly 130 along a second cathode interconnect 136, in the set of cathode interconnects 136 and interposed between the second cathode collector 134 and a third cathode collector 134 in the series of cathode collectors 134, to locate the third cathode collector 134 over the third anode collector 114 in Block S150, a first side of the third cathode collector 134 coated with a fifth cathode electrode 140 in contact with the fifth separator 160 (to form a fifth battery cell 155), and a second side of the third cathode collector 134 coated with a sixth cathode electrode 140; folding the anode assembly 110 along a third anode interconnect 116, in the set of anode interconnects 116 and interposed between the third anode collector 114 and a fourth anode collector 114 in the series of anode collectors 114, to locate the fourth anode collector 114 over the third cathode collector 134 in Block S140, a first side of the fourth anode collector 114 coated with a sixth anode electrode 120 and a sixth separator 160 in contact with the sixth cathode electrode 140 (to form a sixth battery cell 156), and a second side of the sixth anode collector 114 coated with a seventh anode electrode 120 and a seventh separator 160; and folding the cathode assembly 130 along a third cathode interconnect 136, in the set of cathode interconnects 136 and interposed between the third cathode collector 134 and the last cathode collector 135 in the series of cathode collectors 134, to locate the last cathode collector 135 over the fourth anode collector 114 in Block S150, a first side of the last cathode collector 135 coated with a seventh cathode electrode 140 in contact with the seventh separator 160 (to form a seventh battery cell 157).

2.1 Applications

Generally, the method S100 can be executed by an assembly system to fabricate a battery unit 100 containing folded and interdigitated anode and cathode assemblies no, 130 in which anodes and cathodes define broad, planar faces located approximately parallel to external battery terminals of the battery unit 100, such as described above. In one implementation, the assembly system includes an anode assembly fabrication unit, a cathode assembly fabrication unit, a folding station, and a battery enclosure station that cooperate to automatically execute Blocks of the method S100 to fabricate complete, three-dimensional battery units 100 in small packages, such as: cylindrical coin cell batteries; flat square or rectangular batteries; truncated-circular (or "squircle") batteries; toroidal batteries; lozenge batteries; etc.

2.2 Assembly Method: Anode Roll+Fabricated Separator

In one implementation shown in FIG. 5, the assembly system includes an anode assembly fabrication unit that fabricates a continuous row of anode collectors 114 connected by anode interconnects 116 and coated on both sides with anode material 122 and separator material in Block S102. The assembly system then: resects a set of anode collectors 114—each coated with anode material 122 and separator material—from this "anode tape" to prepare an anode assembly 110 for folding into a battery cell; loads the anode assembly 110 and a similar cathode assembly 130 into a folding station; folds the anode and cathode assemblies 110, 130 to form a folded battery cell stack 150; and assembles this folded battery cell stack 150 within a battery housing 170 to form a completed battery unit 100.

2.2.1 Anode Tape: Anode Collector Resection→Anode Fabrication

In this implementation, the anode assembly fabrication unit can include a sequence of stations including: an anode cutter; an anode material 122 applicator; an anode material 122 curing station; an anode material 122 removal station; a separator 160 applicator; and/or a separator 160 curing station; etc. Accordingly, the anode assembly fabrication unit can process a continuous roll (or "tape") of anode collector 114 material (e.g., a copper or aluminum foil) through this sequence of stations to prepare a continuous anode tape containing a series of anode collectors 114 connected by anode interconnects 116, coated with anode material 122, and encapsulated with separator material.

In particular, the anode assembly fabrication unit can: receive a tape of anode collector 114 material; trim the tape of anode collector material to form a continuous row of anode collectors 114 connected by anode interconnects 116; coat first sides and second sides of the continuous row of anode collectors 114 with an anode material 122 to form a set of anode electrodes 120 on first sides and second sides of anode collectors 114 in the continuous row of anode collectors 114; coat the set of anode electrodes 120 with a separator material to form a set of separators 160 over the set of anode electrodes 120 and the continuous row of anode collectors 114; and resect the anode assembly 110 from the continuous row of anode collectors 114 to form the anode assembly 110 in Block S110. A cathode assembly fabrication unit can similarly fabricate and resect a cathode assembly 130 in Block S112. The assembly system can then: fold the first anode assembly 110 and the first cathode assembly 130 as described below to form a first folded battery cell stack 150 in Blocks S120, S130, 140, and S150; wet a second set of the separators 160, in the second folded battery cell stack 150, with solvated ions 162 in Block S180; and load the second folded battery cell stack 150 into a second battery housing 170 in Block S190.

Similarly, in this implementation, the assembly system can then: resect a second anode assembly 110—including a second series of anode collectors 114 connected by a second set of anode interconnects 116—from the continuous row of anode collectors 114 in Block S110; receive a second cathode assembly 130 including a second series of cathode collectors 134 connected by a second set of cathode interconnects 136 in Block S112; fold the second anode assembly 110 and the second cathode assembly 130 to form a second folded battery cell stack 150 in Blocks S120, S130, 140, and S150; wet a second set of the separators 160, in the second folded battery cell stack 150, with solvated ions 162 in Block S180; and load the second folded battery cell stack 150 into a second battery housing 170 in Block S190.

2.2.2 Anode Collector and Anode Interconnect Trimming

In this implementation, an operator may load a rectangular tape of anode collector 114 material into the anode assembly fabrication unit and then feed a tongue of this anode tape into an anode cutter. The anode cutter can then cut the anode tape to form a sequence of anode collectors 114—connected by anode interconnects 116—as the anode tape moves toward an anode material 122 applicator. For example, the anode cutter can: die cut the anode tape with a continuous circular die; intermittently die cut a set of anode collectors 114 and anode interconnects 116 into the anode tape with a linear die; or trim the anode tape to form the anode collectors 114 and anode interconnects 116 with two laser cutters, two waterjet cutters, or mechanical blades, etc. that continuously cut the tape as the tape is pulled off the roll and toward the anode material 122 applicator.

2.2.3 Anode Material Application: Separate Mask

In one implementation, the anode material 122 applicator: locates a set of masks over a section of the anode tape to mask a first side of a first anode collector 115 and both sides of a series of anode interconnects 116; sprays or otherwise coats anode collectors 114—exposed by apertures in the masks—along the anode tape with an anode slurry (e.g., graphite, a binder, and a solvent); dries or cures the anode material 122 (e.g., by heating the anode tape to evaporate the solvent); removes the masks; and presses the anode electrodes (e.g., via calendaring process) to increase density of anode electrodes 120 on both sides of anode collectors 114 in this section of the anode tape.

For example, the anode material 122 applicator can: pause the anode tape moving off of the anode cutter; locate the two opposing masks—hinged in a clamshell configuration—around a series of eight anode collectors 114 in a section of the anode tape moving off of the anode cutter; spray the exposed regions of both sides of this section of the anode tape with anode material 122; cure the anode material 122 by heating; open the masks; advance the anode tape forward (e.g., through calendaring machine); and repeat this process for a next set of anode collectors 114 in a next section of the anode tape.

In another example, the anode material 122 applicator can: move the set of masks with the anode tape as the anode moves off of the anode cutter; align apertures in the masks with uncoated anode collectors 114 along the anode tape; spray anode slurry onto both sides of exposed regions of these anode collectors 114; withdraw the masks from the anode tape; and repeat these processes for a next upstream series of anode collectors 114 along the anode tape.

However, the anode material 122 applicator can selectively mask and coat anode collectors 114 along the continuous anode tape with anode material 122 in any other way.

The anode assembly fabrication can also advance the anode tape—with anode collectors 114 now coated with anode slurry—into the anode material 122 curing station, which heats the anode tape and the applied anode slurry to drive off the solvent and/or cures the anode material 122 into electrodes on each side of each anode collector 114 but excluded from the anode interconnects 116 (and the first side of the first anode collector 115 in each series of anode collectors 114 allocated for one battery unit 100).

Therefore, in this implementation, the anode assembly fabrication can: mask a first side of a first anode collector 115, in the continuous row of anode connectors along the anode tape; and spray-coat first sides and second sides of the continuous row of anode collectors 114 with the anode material 122 to form a continuous row of anode collectors 114 coated with anode electrodes 120.

2.2.4 Anode Material Application: Targeted Application

In another implementation, the anode material 122 applicator includes a first dropper or pipette that dispenses a metered amount of anode slurry onto the first, upward-facing side of each anode collector 114 (except the first anode collector 115 in each series of anode collectors 114 allocated for one battery unit 100) entering the anode material 122 applicator.

The anode assembly fabrication unit can then move these anode collectors 114 and anode slurry volumes into a first anode material 122 curing station, which heats and cures the anode slurry to form anode electrodes 120 over the first sides of the anode collectors 114. In particular, in this implementation, the volume of anode slurry: can contain a proportion of solvent that evaporates when heated in the first anode material 122 curing station; can level out over a side of an anode collector 114 as solvent is driven out of the anode material 122; and can coat the full area of a side of an anode collector 114 but can be held off of the adjacent anode interconnect 116($s$) on each end of the anode collector 114, such as by capillary action.

As the anode tape exits the first anode material 122 curing station, the anode assembly fabrication unit can roll the anode tape to locate the second faces of these anode collectors 114 facing upwardly before a second dropper or pipette dispenses a metered amount of anode slurry onto the second side of each anode collector 114 applicator. The anode assembly fabrication unit then moves the anode tape into a second anode material 122 curing station, which heats and cures these volumes of anode slurry to form anode electrodes 120 over the second sides of these anode collectors 114.

In a similar implementation, the anode material 122 applicator includes a nozzle that sprays anode slurry (or a dry anode material 122) directly onto an anode collector 114 across a tightly-controlled spray pattern that approximates the area of the anode collector 114, thereby coating the anode collector 114 in a single spray application with minimal or no overspray onto the adjacent anode interconnects 116. In this implementation, the anode material 122 applicator can include a set of nozzles: arranged at a pitch distance equal to the unfolded pitch distance between anode collectors 114 along the tape; and configured to simultaneously dispense anode material 122 onto a set of anode collectors 114 as the anode tape moves through the anode material 122 applicator. Additionally or alternatively, these sets of nozzles can dispense a sequence of layers of anode material 122 onto these anode collectors 114 in order to build anode electrode thickness over a sequence of steps with minimal or no overspray on the anode interconnects 116 before these anode collectors 114 enter the anode material 122 curing station. The anode assembly fabrication unit can then advance the anode tape—with anode collectors 114 now coated with anode slurry—into the anode material 122 curing station, which heats the anode tape and the applied anode slurry to drive off the solvent and cure the anode material 122 into electrodes on each side of the anode collectors 114 but excluded from the anode interconnects 116 (and the first side of the first anode collector 115 in each series of anode collectors 114 allocated for one battery unit 100).

In a similar implementation, the anode material 122 applicator includes a first rotary screen printing unit that: feeds anode material 122 into a first roller, which runs over the anode tape and selectively deposits anode material 122 onto the first sides of all anode collectors 114—except a first anode collector 115—in each series of anode collectors 114 allocated for a battery cell and withholds anode material 122 from the anode interconnects 116; then feeds the anode tape into a first anode material 122 curing station to cure the anode material 122 on the first side of the anode tape; then repeats this process for the second side of the anode tape by rolling the anode tape 180° and passing the anode tape through a second rotary screen printing unit and second anode material 122 curing station.

2.2.5 Anode Material Application: Applied Mask

In another implementation, the anode material 122 applicator includes a first stamp, roller, brush, or other applicator that applies a (non-conductive) hydrophobic coating onto both sides of the anode interconnects 116 entering the anode material 122 applicator and onto the first side of the first anode collector 115 in each series of anode collectors 114 allocated for one battery unit 100. The anode material 122 applicator then implements methods and techniques described above to apply an anode slurry—including a polar solvent—onto both sides of the anode tape, such as: by spray- or continuous-dip-coating both sides of the anode tape with the anode slurry; by pipetting controlled volumes of the anode slurry onto each side of each anode collector 114 (other than the first side of the first anode collector 115 in each series of anode collectors 114 allocated for one battery unit 100); or by the spraying anode slurry through a set of masks onto these anode collectors 114. However, in this implementation, the hydrophobic coating—applied across the anode interconnects 116 and the first side of the first anode collector 115—can thus prevent the anode slurry from running onto the anode interconnects 116 and the first side of the first anode collector 115.

The anode assembly fabrication unit can then advance the anode tape—with anode collectors 114 now coated with anode slurry—into the anode material 122 curing station, which heats the anode tape and the applied anode slurry to drive off the solvent and cure the anode material 122 into electrodes on each side of the anode collectors 114 but excluded from the anode interconnects 116 (and the first side of the first anode collector 115 in each series of anode collectors 114 allocated for one battery unit 100).

2.2.6 Anode Material Application+Anode Material Removal Before Cure

In another implementation, the anode assembly fabrication unit draws the anode tape through the anode material 122 applicator, which spray- or continuous-dip-coats anode slurry (e.g., graphite, a binder, and a solvent) onto first and second sides of the anode tape. The assembly system then advances the coated anode tape through the anode material 122 removal station, which selectively removes anode material 122 from both sides of each anode interconnect 116 (and the first anode collector 115 in each series of anode collectors 114 allocated for one battery unit 100) entering the anode material 122 removal station and before the anode slurry is cured on the anode tape. For example, the anode material 122 removal station can include brushes or rollers that mechanically wipe wet (i.e., uncured) anode slurry from both sides of the anode interconnects 116. In another example, the anode material 122 removal station includes a set of cleaning jets that spray a solvent toward the anode tape to remove wet anode slurry from the anode interconnects 116 and the first side of each first anode collector 115 via jet impingement. The anode assembly fabrication unit then advances the anode tape—with anode collectors 114 now coated with anode slurry—into the anode material 122 curing station, which heats the anode tape and the applied anode slurry to drive off the solvent and cure the anode material 122 into electrodes on each side of the anode collectors 114 but excluded from the anode interconnects 116 (and the first side of the first anode collector 115 in each series of anode collectors 114 allocated for one battery unit 100).

In a similar implementation, the anode assembly fabrication unit implements methods and techniques similar to those described above to apply a UV-curable anode material 122 onto all sides of the anode tape. The anode material 122 curing station then: implements methods and techniques similar to those described above to mask both sides of the anode interconnects 116 along the anode tape; and exposes the anode tape to UV radiation, thereby curing exposed regions of anode material 122 (i.e., over the anode collectors 114) to selectively form anode electrodes 120 over both sides of the anode collectors 114 (except the first side of each first anode collector 115). The anode assembly fabrication unit then advances the anode tape with cured anode electrodes 120 through the anode material 122 removal station, which washes uncured anode material 122 from the anode tape (e.g., from both sides of each anode interconnect 116 and the first anode collector 115 in each series of anode collectors 114 allocated for one battery unit 100). For example, the anode material 122 removal station can include a vibrating table flooded with solvent that dissolves uncured anode material 122 from the anode tape (e.g., from anode interconnects 116 and the first sides of first anode collectors 115). Additionally or alternatively, the anode material 122 removal station can include a set of jets that spray solvent across the anode tape to remove this uncured anode material 122.

2.2.7 Anode Material Application+Anode Material Removal after Cure

In another implementation, the anode assembly fabrication unit: draws the anode tape through the anode material 122 applicator, which spray- or continuous-dip-coats anode slurry (e.g., graphite, a binder, and a solvent) onto first and second sides of the anode tape; and then advances the anode tape—with anode collectors 114 now coated with anode slurry—into the anode material 122 curing station for curing across both anode collectors 114 and anode interconnects 116. The anode assembly fabrication unit then advances the anode tape with cured anode electrodes 120 through the anode material 122 removal station, which selectively removes cured anode material 122 from both sides of each anode interconnect 116 (and the first anode collector 115 in each series of anode collectors 114 allocated for one battery unit 100).

For example, the anode material 122 removal station can remove the cured anode material 122 from both sides of each anode interconnect 116 (and the first anode collector 115 in each series of anode collectors 114 allocated for one battery unit 100): with an abrasive wheel or brush that mechanically abrades cured anode material 122 from the anode interconnects 116; a cleaning jet that sprays air or water (such as with an abrasive media, such as garnet) toward the anode tape to remove cured anode material 122 from the anode interconnects 116; or with a laser via laser ablation.

2.2.8 Separator Fabrication

The separator 160 applicator and/or the separator 160 curing station of the anode assembly fabrication unit can implement similar methods and techniques to fully coat all sides of the anode tape—excluding the first side of the first anode collector 115 in each series of anode collectors 114 allocated for one battery unit 100—with a separator 160, as shown in FIGS. 5 and 6.

In one implementation, the separator 160 applicator spray-coats first sides and second sides of a continuous row of anode collectors 114—in the anode tape—with a volume of separator material that includes: a first solvent; a first monomer miscible (e.g., dissolved) in the first solvent; a secondary polymer immiscible in the first solvent but miscible in a second solvent; and/or a catalyst that polymerizes the monomer. The separator 160 curing station can then: dry the first solvent from the volume of the separator material once applied to the anode tape; and/or initiate polymerization of the first monomer within the volume of the separator material to form a set of separators 160 entrapping a network of the secondary polymer across the anode collectors 114 along the anode tape.

For example, the separator 160 curing station can be cospatial with the separator 160 applicator and can include: a heat lamp that heats the separator material and drives the first solvent out of the separator material that coats the anode tape; and a UV-lamp that irradiates the dried separator material with UV light to catalyze the polymerization of the monomer, which then entraps the secondary polymer in an open-cell network throughout the thickness of a resulting contiguous separator 160 layer that encapsulates the anode tape. Later, the anode assembly fabrication unit can dissolve the secondary polymer out of the separator 160 layer (i.e., out of separators 160 spanning anode collectors 114 along the anode tape) in preparation for receiving solvated ions 162 once anode assemblies are cut from the anode tape and assembled into folded battery cell units, as described below.

For example, the separator 160 applicator and/or the separator 160 curing station can: spray-coat all sides of the anode tape with separator 160 slurry to form a continuous separator 160 film (e.g., between 8 and 12 microns in thickness) across all surfaces of the anode tape; and heat (or "bake") the anode tape to flash off the first solvent, such as while spraying or immediately after spraying the separator 160 slurry across the anode. In one variation in which the catalyst in the separator 160 slurry is UV-activated (e.g., rather than heat-activated), and/or the separator 160 curing station can expose all surfaces of the anode tape (excluding the first side of the first anode collector 115 in each series of anode collectors 114 allocated for one battery unit 100) with UV radiation to activate the catalyst and polymerize the monomer around the secondary polymers, thereby entrapping the secondary polymers in an open-cell network. The anode assembly fabrication unit can then wash, rinse, or soak the cured separator 160 with the first solvent to dissolve any uncured separator 160 slurry from the anode tape, such as by running the tape across a first vibrating table flooded with the first solvent. The anode assembly fabrication unit can then wash, rinse, or soak the cured separator 160 with the second solvent to dissolve the secondary polymers out of the cured separator 160, thereby rendering a network of open-cell pores extending through the separator 160, such as by running the anode tape across a second vibrating table flooded with the second solvent.

In a similar implementation, the separator 160 applicator and/or the separator 160 curing station can mask first sides of first anode collectors 115, in each series of anode collectors 114 allocated for one battery unit 100 in the continuous anode tape; spray-coat exposed first sides and second sides of the anode collectors 114 with the separator material; and implement methods and techniques described above to cure the separator material to encapsulate the anode tape with a contiguous separator 160.

Therefore, the separator 160: can cover both sides of all anode collectors 114 (other than the first side of the first anode collector 115) in a series of anode collectors 114 allocated for a single battery cell; is porous; can be wetted with solvated ions 162; and can thus transport solvated ions 162 between anode electrodes 120 on the anode collectors 114 and anode and cathode electrodes 120, 140 on the cathode collectors 134 within the battery cell. The separator 160 is also non-conductive and covers (e.g., encapsulates) the anode interconnects 116, thereby preventing shorts between the anode interconnects 116 and cathode interconnects 136 or other surfaces within the battery cell.

2.2.9 Anode Series Segmentation

The assembly system can then reset (or dice, cut) a contiguous series of anode collectors 114 from the anode tape to yield a discrete "anode assembly 110" that includes a set of anode collectors 114 connected in series by a set of anode interconnects 116, coated on both sides with anode material 122, and encapsulated in separator material. The assembly system can then feed this anode assembly 110 into the folding station in Block S110, as described below.

However, the anode assembly fabrication unit can implement any other method or technique to fabricate an anode assembly 110 on a continuous anode tape.

2.2.10 Multiple Anode Collector Rows

As described above, the assembly system can process a single row of many anode collectors 114—connected via anode interconnects 116—to form one continuous anode tape containing anode collectors 114 coated with anode material 122 and encapsulated with the separator 160. The assembly system can then reset individual anode assemblies from this anode tape and fold these anode assemblies with similar cathode assemblies to form multiple discrete battery cells, as described below.

Alternatively, the anode assembly fabrication unit can implement similar methods and techniques to process multiple adjacent rows of anode collectors 114 along a singular anode tape, wherein anode collectors 114 within one row are attached via anode interconnects 116 extending longitudinally along the length of the anode tape and wherein adjacent rows of anode collectors 114 are connected by temporary tabs extending laterally across adjacent anode collectors 114 in these rows. In particular, the anode assembly fabrication unit can implement the foregoing methods and techniques to process multiple adjacent and connected rows of anode collectors 114, which together may form a stronger web of anode collectors 114 capable of carrying greater tension than a single row of anode collectors 114 during initial cutting and anode fabrication described above.

The assembly system can then dice this web of anode collectors 114 into multiple discrete anode tapes (e.g., by cutting temporary tabs between anode collectors 114 in different anode collector 114 rows) before coating each discrete anode tape with separator material, thereby ensuring that each anode tape is fully encapsulated with a separator 160 before folding the anode assembly 110 into a battery cell.

2.3 Anode Processing by Individual Segment

In one variation shown in FIG. 2, the anode assembly fabrication unit fabricates and processes individual anode assemblies, such as cut from a sheet.

2.3.1 Anode Material Application Before Dicing

In one implementation, the anode assembly fabrication unit: coats a first side and a second side of a film of anode collector 114 material with an anode material 122; resects a series of anode collectors 114—connected by the set of anode interconnects 116 and coated with the anode material 122 to form an anode assembly 110—from the film of anode collector 114 material; and then coats the series of anode collectors 114, the set of anode interconnects 116, and the anode material 122 located on the series of anode collectors 114 with a separator material to form a continuous non-conductive structure. The continuous non-conductive structure defines a set of separators 160 arranged over anode collectors 114 in the anode assembly 110. The continuous non-conductive structure also encapsulates the set of anode interconnects 116, the second side of a first anode collector 115, the first and second sides of a second anode collector 114, the first and second sides of the third anode collector 114, etc. in the anode assembly 110.

More specifically, in this implementation, the anode assembly fabrication unit can: receive a sheet or film of anode substrate material; coat and cure a continuous film of anode material 122 across the first and second sides of the anode substrate material sheet, such as by spray-or dip-coating followed by heat- or UV-curing as described above;

and then cut anode assemblies—including a specified quantity of (e.g., eight) anode collectors 114 connected by anode interconnects 116 and coated with anode material 122—from the anode substrate material sheet, such as by laser- or waterjet cutting or by punching with a linear die. The anode assembly fabrication unit can then implement methods and techniques described above to: remove cured anode material 122 from anode interconnects 116 and the first side of the first anode collector 115 in this anode assembly 110; and coat the anode assembly 110 with separator material.

Alternatively, in this implementation, the anode assembly fabrication unit can: receive the sheet or film of anode substrate material; locate a mask over the first side of the anode substrate material sheet to cover the anode interconnects 116 and first anode collector 115; spray-coat exposed regions of the first side of the anode substrate material sheet—at anode collector 114 locations—with anode material 122; (heat- or UV-cure the anode material 122 to form anode electrodes 120 on first sides of the anode collectors 114 in this anode assembly 110;) and repeat this process to form anode electrodes 120 on second sides of the anode collectors 114 in this anode assembly 110. The anode assembly fabrication unit can then implement a laser cutter: to remove anode material 122 from the first side of the first anode collector 115 via laser ablation; and to then cut the anode assembly 110—including anode collectors 114 connected by anode interconnects 116 and coated with anode material 122—from the anode substrate material sheet. The anode assembly fabrication unit can then implement methods and techniques described above to coat this anode assembly 110 with separator material.

2.3.2 Anode Material Application after Dicing

In another implementation, the anode assembly fabrication unit: receives a sheet or film of anode substrate material; and cuts an anode assembly 110—including anode collectors 114 connected by anode interconnects 116—from the anode substrate material sheet, such as by laser- or waterjet cutting. The anode assembly fabrication unit then: dip- or spray-coats both sides of the resulting anode assembly 110 with anode material 122; implements methods and techniques described above to remove uncured anode material 122 from both sides of the anode interconnects 116 and the first side of the first anode interconnect 116; cures the anode material 122 to form anode electrodes 120 over the anode collectors 114; and then encapsulates this anode assembly 110 in separator material.

Alternatively, the anode assembly fabrication unit can: mask the anode substrate material and apply anode material 122 onto exposed regions of anode substrate material to coat both sides of the anode collectors 114 with anode material 122; cure this applied anode material 122 to form anode electrodes 120 over the anode collectors 114; and then encapsulate this anode assembly 110 in separator material.

2.4 Cathode Assembly

The assembly system can similarly include a cathode assembly fabrication unit that implements similar methods and techniques to fabricate a cathode assembly 130 containing a row of cathode collectors 134 connected via cathode interconnects 136 and coated with cathode material 142 on both sides—such as except for a second side of a last cathode collector 135 in the cathode assembly 130 in Block S102. For example, the cathode assembly fabrication unit can fabricate a cathode assembly 130 from a continuous roll of cathode substrate material or from a sheet of cathode substrate material, such as copper or aluminum foil.

In particular, the anode assembly 110 can be encapsulated with separator 160, but separator material can be excluded from the cathode assembly 130. Conversely, the cathode assembly 130 can be encapsulated with separator 160, but separator material can be excluded from the anode assembly 110.

Yet alternatively, both the anode and cathode assemblies 110, 130 can be coated with separator material, such as each to a thickness approximately half of a target separator 160 thickness between anode and cathode electrodes 120, 140. Thus, in this implementation, both the anode assembly 110 and the cathode assembly 130 can be encapsulated with the separator material to prevent shorting between the anode and cathode assemblies 110, 130 and the battery housing 170 once assembled within a battery unit 100.

2.6 Folding Process

The assembly system then loads an anode assembly 110 into the folding station in Block S110, loads a cathode assembly 130 into the folding station in Block S112, and folds the anode assembly 110 and the cathode assembly 130 in Blocks S120, S130, S140, and S150 to form a folded battery cell stack 150, as shown in FIGS. 3, 4A, 4B, 4C, 8A, 8B, 8C, and 8D.

Figure 8A:
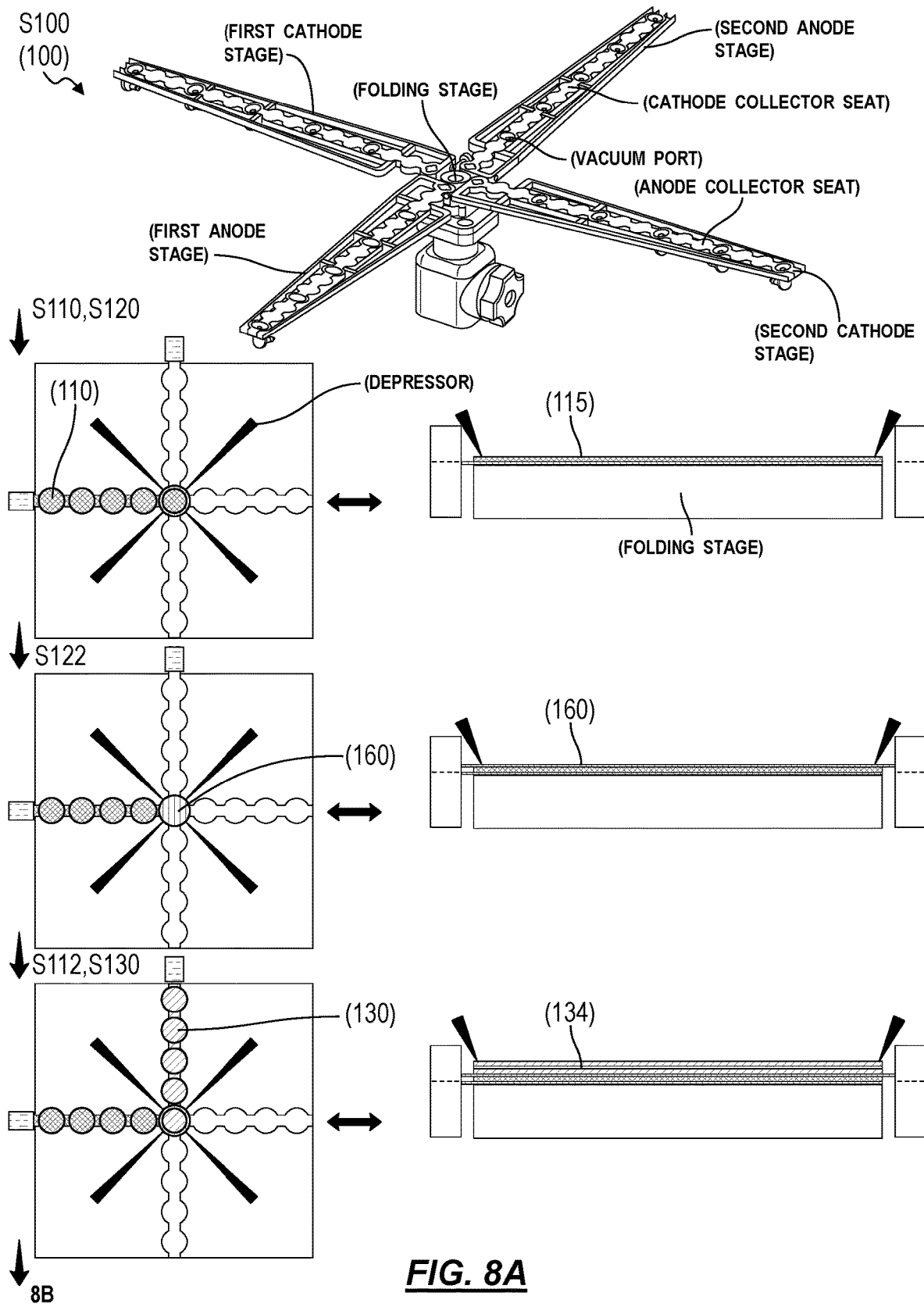
FIGS. 8A, 8B, 8C, and 8D are a flowchart representation of one variation of the method.

In one implementation shown in FIG. 8A, the folding station includes: a first anode stage hinged proximal and extending laterally outwardly from the folding stage in a first direction; a second anode stage hinged proximal and extending laterally outwardly from the folding stage in a second direction radially offset from the first direction; a first cathode stage hinged proximal the folding stage and extending laterally outwardly from the folding stage in a third direction orthogonal to the first direction; and a second cathode stage hinged proximal and extending laterally outwardly from the folding stage in a fourth direction opposite the third direction. The first anode stage can include: a series of anode collector seats, each offset from an adjacent anode collector seat by a distance equal to a pitch distance between anode collectors 114 in the anode assembly no; and a first anode collector 115 seat offset from the center of the folding stage by this same pitch distance. The first anode stage can be hinged along an axis centered between the first anode collector 115 seat and the folding stage such that pivoting the first anode stage 180° about this hinge centers the first anode collector 115 seat over the folding stage and thus centers a second anode collector 114 located on the first anode collector 115 seat over a stack of anode collectors 114 and/or cathode collectors 134 currently located on the folding stage. The first anode stage can also include a set of vacuum ports arranged on some or all anode collector seats and configured to selectively raw vacuum against the first face of an anode assembly 110 in order to retain this anode assembly 110 on the first anode stage during a folding cycle.

The second anode stage, the first cathode stage, and the second cathode stage can be similarly configured.

At the beginning of a folding cycle, the folding station can: raise the folding platform to a first vertical position to receive the first anode collector 115; locate the anode assembly 110 on the first anode stage in Blocks S110 and S120 with first sides of the series of anode collectors 114 facing the first anode stage and with the first side of the first anode collector 115 in the anode assembly 110 facing and in contact with the folding stage. The folding station then lowers the folding platform to a second vertical position—offset below the first vertical position by a sum of thicknesses of the first anode collector 115, the first anode electrode 120, and the first separator 160—to receive the first cathode collector 135 over the first anode collector 115.

The folding station then: locates the cathode assembly 130 on the first cathode stage in Blocks S112 and S130 with first sides of the series of cathode collectors 134 facing the first cathode stage and with the first side of the first anode collector 115 in contact with the first separator 160 over the first anode electrode 120 and the first anode collector 115; and lowers the folding platform to a third vertical position—offset below the second vertical position by a sum of thicknesses of the first cathode electrode 140, the first cathode collector 135, and the second cathode electrode 140—to receive the second anode collector 114 over the first cathode collector 135.

The folding station then: pivots the first anode stage over the folding stage in Block S140 to seat the second side of the second anode collector 114 onto the first side of the first cathode collector 135; lowers the folding platform to a fourth vertical position—offset below the third vertical position by a sum of thicknesses of the second anode collector 114, the second anode electrode 120, and the second separator 160—to receive the second cathode collector 134 over the second anode collector 114; pivots the cathode anode stage over the folding stage in Block S150 to seat the first side of the second cathode collector 134 onto the second side of the second cathode collector 134; and lowers the folding platform to a fifth vertical position—offset below the fourth vertical position by a sum of thicknesses of the third cathode electrode 140, the second cathode collector 134, and the fourth cathode electrode 140—to receive a third anode collector 114 over the second cathode collector 134.

The folding station can then repeat this process to fold and interdigitate remaining anode collectors 114 and cathode collectors 134 in the anode assembly 110 and the cathode assembly 130.

2.6.1 First Fold

In one example, the folding station: transfers an individual anode assembly 110 onto the first anode stage—hinged around the folding stage—with the first side of the anode assembly 110 facing downwardly on the anode stage; and transfers an individual cathode assembly 130 onto the first cathode stage—hinged around the folding stage perpendicular to the first anode stage—with the first side of the cathode assembly 130 facing downwardly on the cathode stage. The folding station then: raises the folding stage—located within the center of folding station—to receive a first anode collector 115 of the anode assembly 110; advances the anode assembly 110 forward on the anode stage to seat the first side of the first anode collector 115 in the anode assembly 110 onto the folding stage; activates a vacuum port on the folding stage to retain the first anode collector 115 on the folding stage; lowers the folding stage by a thickness of the anode assembly 110 at the first anode collector 115; advances the cathode assembly 130 forward on the cathode stage to seat the first side of the first cathode collector 135 in the cathode assembly 130 over a first anode electrode 120 on the second side of the first anode collector 115.

The folding station then drives a depressor downward to depress the first cathode collector 135 against the first anode collector 115, such as: to bond the first separator 160 on the first anode electrode 120 to the first cathode collector 135 on the first side of the first cathode collector 135; and/or to retain the first cathode collector 135 in position over the first anode collector 115. The folding station then lowers the folding stage by the sum of thicknesses of the anode assembly 110 at the first anode collector 115 and the cathode assembly 130 at the first cathode collector 135 now loaded onto the folding stage. With the depressor advanced and retaining the first cathode collector 135 against the first anode collector 115, the folding station pivots the first anode stage 180° over the folding stage to fold the first anode interconnect 116 180°.

As the first side of the second anode collector seats over the second side of the first cathode collector 135, the folding station withdraws the depressor and draws a partial vacuum on vacuum ports in the second anode stage. Once the second side of the anode assembly 110 seats on the second anode stage, the folding station: releases vacuum on vacuum ports in the first anode stage to release the anode assembly 110 from the first anode stage; and returns the first anode stage to its original position.

2.6.2 Mandrel

In one variation shown in FIG. 4A, the folding station slides a mandrel—defining a target bend profile of the first anode interconnect 116 (e.g., a radius ten times the thickness of the anode interconnect 116)—laterally over the first anode interconnect 116 such that the first anode stage draws the first anode interconnect 116 180° around the mandrel to create a smooth bend radius.

In one implementation, the mandrel is spring-loaded between the folding stage and the first anode stage and is biased outwardly from the folding stage. Before folding the anode assembly 110 along the first anode interconnect 116 in Block S140, the folding station extends the anode collector 114 over the first anode interconnect 116 between the folding stage and the first anode stage. Accordingly, the mandrel: engages and forms the first anode interconnect 116 as the folding station pivots the first anode stage over the folding stage; and then deflects inwardly toward the folding stage as the first anode interconnect 116 is tensioned against the mandrel.

Once the first anode stage is fully inverted and seats the second side of the anode assembly 110 against the second anode stage, the folding station can draw the mandrel out of the folded first anode interconnect 116.

Therefore, in this variation, the folding station can: temporarily locate a mandrel—defining a target interconnect fold geometry—over the first anode interconnect 116 at a first time; folding the anode assembly 110 around the first mandrel at a second time succeeding the first time to form the anode interconnect 116 according to the target interconnect fold geometry; and then withdraw the first mandrel from the first anode interconnect 116 at a third time succeeding the second time in Block S140 before initiating Block S150.

2.6.3 Second Fold

The folding station then: drives the depressor (or a second depressor) downward to depress the second anode collector 114 against the first cathode collector 135; and lowers the folding stage by the sum of the thicknesses of the anode assembly 110 at the first and second anode collectors 114 and the cathode assembly 130 at the first cathode collector 135 now loaded onto the folding stage. With the depressor (or the second depressor) advanced and retaining the second anode collector 114 against the first cathode collector 135, the folding station pivots the first cathode stage 180° over the folding stage to fold the first cathode interconnect 136 180°.

As the first side of the second cathode collector seats over the second side of the first anode collector 115, the folding station withdraws the depressor and draws a partial vacuum on vacuum ports in the second cathode stage. Once the second side of the cathode assembly 130 seats on the second cathode stage, the folding station: releases vacuum on vacuum ports in the first cathode stage to release the cathode assembly 130 from the first cathode stage; and returns the first cathode stage to its original position.

As described above, the folding station can also extend a second mandrel between the folding stage and the first cathode stage to form the first cathode interconnect 136. For example, the folding station can: locate a second mandrel—defining the target interconnect fold geometry—over the first cathode interconnect 136 at a fourth time succeeding the third time described above; fold the cathode assembly 130 around the second mandrel at a fifth time succeeding the fourth time to form the cathode interconnect 136 according to the target interconnect fold geometry; and then withdraw the second mandrel from the first cathode interconnect 136 at a sixth time succeeding the fifth time in Block S150 before initiating a next fold of the anode assembly 110.

2.6.4 Third Fold

The folding station then: drives the depressor (or a third depressor) downward to depress the second cathode collector 134 against the second anode collector 114; and lowers the folding stage by the sum of the thicknesses of the anode assembly 110 at the first and second anode collectors 114 and the cathode assembly 130 at the first and second cathode collectors 134 now loaded onto the folding stage. With the depressor advanced and retaining the second cathode collector 134 against the second anode collector 114, the folding station pivots the second anode stage 180° over the folding stage to fold a second anode interconnect 116 180°.

As the first side of the third anode collector seats over the second side of the second cathode collector 134, the folding station withdraws the depressor and draws a partial vacuum on vacuum ports in the first anode stage. Once the second side of the anode assembly 110 seats on the first anode stage, the folding station: releases vacuum on vacuum ports in the second anode stage to release the anode assembly 110 from the second anode stage; and returns the second anode stage to its original position.

2.6.5 Fourth Fold

The folding station then: drives the depressor (or a fourth depressor) downward to depress the third anode collector 114 against the second cathode collector 134; and lowers the folding stage by the sum of the thicknesses of the anode assembly 110 at the first, second, and third anode collectors 114 and the cathode assembly 130 at the first and second cathode collectors 134 now loaded onto the folding stage. With the depressor (or the fourth depressor) advanced and retaining the third anode collector 114 against the second cathode collector 134, the folding station pivots the second cathode stage 180° over the folding stage to fold the second cathode interconnect 136 180°.

As the first side of the third cathode collector seats over the second side of the third anode collector 114, the folding station withdraws the depressor and draws a partial vacuum on vacuum ports in the first cathode stage. Once the second side of the cathode assembly 130 seats on the second cathode stage, the folding station: releases vacuum on vacuum ports in the second cathode stage to release the cathode assembly 130 from the second cathode stage; and returns the second cathode stage to its original position.

2.6.6 Next Folds

The folding station repeats the foregoing process to fold each subsequent anode interconnect 116 and cathode interconnect 136 in the anode and cathode assembles, respectively, to form a boustrophedonic anode stack and the boustrophedonic cathode stack that are interdigitated to form a folded battery cell stack 150. Accordingly, the folded battery cell stack 150 includes a set of anode interconnects 116: that extend outwardly from the series of anode collectors 114; and that extend around and are isolated from the set of cathode collectors 134. The folded battery cell stack 150 similarly includes a set of cathode interconnects 136: that extend outwardly from the series of cathode collectors 134 orthogonal to the set of anode interconnects 116; and that extend around and are isolated from the set of anode collectors 114.

2.6.7 Retention and Seating Controls

Therefore, the folding station can draw partial vacuum on vacuum ports in the anode and cathode stages to retain the anode and cathode assemblies 110, 130 during the folding cycle.

In particular, when folding the anode assembly 110 along the first anode interconnect 116 in Block S140, the folding station can: draw partial vacuum on a first set of ports—located in the first anode stage and cospatial with a first subset of anode collectors 114 in the series of anode collectors 114—to retain the anode assembly 110 on the first anode stage; pivot the first anode stage over the folding stage to extend the first anode stage along a second direction opposite the first direction and to seat second sides of anode collectors 114 in the anode assembly 110 against the second anode stage extending laterally outwardly from the folding stage in the second direction; release vacuum on the first set of ports to release the anode collector 114 from the first anode stage; and draw partial vacuum on a second set of ports—located in the second anode stage and cospatial with a second subset of anode collectors 114 in the series of anode collectors 114—to retain the anode assembly 110 on the second anode stage.

Furthermore, the first anode stage can include a first series of anode collector seats: offset by a pitch distance between anode collectors 114 in the anode assembly 110 and configured to receive individual anode collectors 114 in the anode assembly 110; and including a first initial anode collector seat adjacent the folding stage and offset from a center of the folding stage by the pitch distance. Similarly, the second anode stage can include a second series of anode collector seats: offset by the pitch distance between anode collectors 114 in the anode assembly 110 and configured to receive individual anode collectors 114 in the anode assembly 110; and including a second initial anode collector seat adjacent the folding stage and offset from the center of the folding stage by the pitch distance. Thus, when pivoting the first anode stage over the folding stage in Block S130, the folding station can: locate the first initial anode collector seat over the folding stage; and locate a first secondary anode collector seat—behind the first initial anode collector seat in the first series of anode collector seats—over a second initial anode collector seat in a second series of anode collector seats defined along the second anode stage.

Similarly, when folding the cathode assembly 130 along the first cathode interconnect 136 in Block S150, the folding station can: draw partial vacuum on a third set of ports—located in the first cathode stage and cospatial with a first subset of cathode collectors 134 in the series of cathode collectors 134—to retain the cathode assembly 130 on the first cathode stage; pivot the first cathode stage over the folding stage to extend the first cathode stage along a second direction opposite the first direction and to seat second sides of cathode collectors 134 in the cathode assembly 130 against the second cathode stage extending laterally outwardly from the folding stage in the second direction; release vacuum on the third set of ports to release the cathode collector 134 from the first cathode stage; and draw partial vacuum on a fourth set of ports—located in the second cathode stage and cospatial with a second subset of cathode collectors 134 in the series of cathode collectors 134—to retain the cathode assembly 130 on the second cathode stage.

Furthermore, the first cathode stage can include a first series of cathode collector seats: offset by a pitch distance between cathode collectors 134 in the cathode assembly 130 and configured to receive individual cathode collectors 134 in the cathode assembly 130; and including a first initial cathode collector seat adjacent the folding stage and offset from a center of the folding stage by the pitch distance. Similarly, the second cathode stage can include a second series of cathode collector seats: offset by the pitch distance between cathode collectors 134 in the cathode assembly 130 and configured to receive individual cathode collectors 134 in the cathode assembly 130; and including a second initial cathode collector seat adjacent the folding stage and offset from the center of the folding stage by the pitch distance. Thus, when pivoting the first cathode stage over the folding stage in Block S140, the folding station can: locate the first initial cathode collector seat over the folding stage; and locate a first secondary cathode collector seat—behind the first initial cathode collector seat in the first series of cathode collector seats—over a second initial cathode collector seat in a second series of cathode collector seats defined along the second cathode stage.

2.7 Variation: Continuous Anode and Cathode Tapes

In one variation, rather than manipulate individual anode and cathode assemblies 110, 130, the folding station: receives whole anode and cathode tapes, such as on cassettes supported over the folding stage; and loads end segments of the anode and cathode tapes onto the first anode stage and the first cathode stage, respectively, at the start of a fold cycle.

Then, while folding the first anode interconnect 116 in Block S140, the folding station transfers the anode tape from a first quadrant over the first anode stage to a third quadrant over the second anode stage in order to move the anode tape out of the way of the first cathode stage in Block S150. Similarly, while folding the first cathode interconnect 136 in Block S150, the folding station transfers the cathode tape from a second quadrant over the first cathode stage to a fourth quadrant over the second cathode stage in order to move the cathode tape out of the way of the second anode stage during a next fold.

Similarly, while folding the second anode interconnect 116 thereafter, the folding station transfers the anode tape from the third quadrant over the second anode stage back to the first quadrant over the first anode stage in order to move the anode tape out of the way of the second cathode stage. While folding the second cathode interconnect 136 thereafter, the folding station transfers the cathode tape from the fourth quadrant over the second cathode stage back to the second quadrant over the first cathode stage in order to move the cathode tape out of the way of the first anode stage during a next fold.

Upon completion of the fold cycle, the folding station can resect the last anode collector 114 from the anode tape, such as by drawing a mechanical blade or a laser beam along an anode interconnect 116 extending from the last anode collector 114 in the folded battery cell stack 150. The folding station can also resect the last cathode collector 135 from the cathode tape, such as by drawing the mechanical blade or the laser beam along a cathode interconnect 136 extending from the last cathode collector 135 in the folded battery cell stack 150.

2.8 Initial Packaging

As shown in FIGS. 4B and 7, the folding station can then: load a cathode-side battery housing component 172 (e.g., the second battery housing component 172 described above) onto a distal end of an actuator arranged over the folding stage; and drive this cathode-side battery housing component 172 downward toward the folding stage and onto the folded battery cell stack 150. For example, the folding station can feed a magazine of cathode-side battery housing components 172 toward the distal end of an actuator, which includes a vacuum end effector that retrieves a next cathode-side battery housing component 172 from the magazine and extends downward toward the folding stage to locate the cathode-side battery housing component 172 over the folding stage with the interior of the cathode-side battery housing component 172 facing the folded battery cell stack 150.

Once the interior face of the cathode-side battery housing component 172 is seated over the second side of the last cathode collector 135 in the folded battery cell stack 150, the folding station can raise the folding stage and/or further lower the actuator to compress the cathode-side battery housing component 172 against the folded battery cell stack 150, thereby: fully mating the anode electrodes 120, anode and cathode electrodes 120, 140, separators 160, and the interior base of the cathode-side battery housing component 172 in Block S190; and forming a partial-package battery assembly.

Alternatively, the folded battery cell stack 150 can be removed or dropped from the folding stage and loaded (e.g., by a pick and place machine, a sorter, a human technician) into the cathode-side battery housing component 172 (or into an anode-side battery housing component 171) in Block S190. The anode- and cathode-side battery housing components 171, 172 can then be welded together, such as by laser or resistive welding.

However, the folded battery cell stack 150 can be loaded into the cathode-side battery housing component 172 (or into an anode-side battery housing component 171) in any other way in Block S190.

2.9 Electrolyte Preparation

The assembly system can then: dry the partial-package battery assembly within a partial-vacuum environment; move the partial-package battery assembly to a dry (e.g., oxygen-free, low-oxygen) environment; and fill the partial-package battery assembly with solvent and solvated ions 162, such as by pipetting solvent and ions (e.g., propylene carbonate and $LiPF_6$) into the partial-package battery assembly within the dry environment. The assembly system can then: draw partial vacuum across the partial-package battery assembly and/or agitate the partial-package battery assembly to improve wetting of the separator 160 and to remove air bubbles from the partial-package battery assembly, as shown in FIGS. 4C and 7.

2.10 Final Battery Assembly

Then, with partial-vacuum drawn around the partial-package battery assembly, the assembly system can lower an anode-side battery housing component 171 (e.g., the first battery housing component 171 described above) onto the partial-package battery assembly, as shown in FIGS. 4C and 7. For example, the assembly system can feed a magazine of anode-side battery housing components 171 toward the distal end of an actuator overhead the partial-package battery assembly within a vacuum chamber. The actuator can include a magnetic end effector that retrieves a next anode-side battery housing component 171 from the magazine and locates the anode-side battery housing component 171 over the partial-package battery assembly with the interior of the anode-side battery housing component 171 facing the first side of the first anode collector 115 in the folded battery cell stack 150 now located within the partial-package battery assembly. The actuator can then advance the anode-side battery housing component 171 downward to assemble the anode-side battery housing component 171 onto the cathode-side battery housing component 172 such that a non-conductive seal or sleeve around the interior wall of the anode-side battery housing component 171 forms an interference fit (e.g., a 0.0005" interference fit) with the cathode-side battery housing component 172 to complete the battery unit 100 (or vice versa).

Alternatively, the walls of the anode-side battery housing component 171 can be oversized on the walls of the cathode-side battery housing component 172. In this implementation, the assembly system can: locate a non-conductive seal or sleeve between the walls of the anode- and cathode-side battery housing components 171, 172; and then crimp or shrink the exterior of the anode-side battery housing component 171 to compress (or "crimp") and seal the walls of the anode-side battery housing component 171 onto the walls of the cathode-side battery housing component 172 to complete the battery unit 100 (or vice versa).

Yet alternatively, the assembly system can bond the anode-side battery housing component 171 to the cathode-side battery housing component 172 (or vice versa) with a non-conductive adhesive to seal the folded battery cell stack 150 and solvated ions 162 within the battery housing 170 in Block S190.

However, the assembly system can assemble the anode- and cathode-side battery housing components 171, 172 in any other way in Block S190 to complete a battery unit 100.

Therefore, when loading the anode assembly 110 and the cathode assembly 130 into the battery housing 170, the assembly system can: install a cathode-side battery housing component 172 onto the anode assembly 110 and the cathode assembly 130—arranged in a folded battery cell stack 150—at a first time in Block S190 to mate the second side of a last cathode collector 135 with an interior face of the cathode-side battery housing component 172 defining a second battery terminal; fill the cathode-side battery housing component 172 with solvated ions 162 to saturate the separator 160 at an intermediate time following the first time in Block S180; and then install an anode-side battery housing component 171 onto the anode assembly 110 and the cathode assembly 130—arranged within the cathode-side battery housing component 172—at a second time succeeding the intermediate time in Block S190 to mate the first side of a first anode collector 115 with a base of the anode-side battery housing component 171 defining a first battery terminal.

2.11 Battery Structure

Therefore, as shown in FIG. 7, the assembly system can: locate the first cathode collector 135 over the first anode collector 115 in Block S130 to form a first battery cell 151 that includes the first anode collector 115, the first anode electrode 120, the first separator 160, the first cathode electrode 140, and the first cathode collector 135; fold the anode assembly 110 along the first anode interconnect 116 in Block S140 to form a second battery cell 152 that includes the first cathode collector 135, the second cathode electrode 140, the second separator 160, the second anode electrode 120, and the second anode collector 114; and fold the cathode assembly 130 along the second anode interconnect 116 in Block S150 to form a third battery cell 153 that includes the second anode collector 114, the third anode electrode 120, the third separator 160, the third cathode electrode 140, and the second cathode collector 134.

Furthermore, the assembly system can: fold the anode assembly 110 along a second anode interconnect 116 to form a fourth battery cell 154; fold the cathode assembly 130 along a second cathode interconnect 136 to form a fifth battery cell 155, and a second side of the third cathode collector 134 coated with a sixth cathode electrode 140; fold the anode assembly 110 along a third anode interconnect 116 to form a sixth battery cell 156; and fold the cathode assembly 130 along a third cathode interconnect 136 to form a seventh battery cell 157; etc.

The assembly system can then load the anode assembly 110 and the cathode assembly 130 into the battery housing 170 with the first battery cell 151, the second battery cell 152, the third battery cell 153, the fourth battery cell 154, the fifth battery cell 155, the sixth battery cell 156, and the seventh battery cell 157 connected in parallel between the first battery terminal of the battery housing 170 and the second battery terminal of the battery housing 170 by the set of anode interconnects 116 in the anode assembly 110 and the set of cathode interconnects 136 in the cathode assembly 130.

2.12 Variation: Multi-Cell Battery Unit

In one variation shown in FIGURE ii, the assembly system assembles multiple (e.g., two) folded battery cell stacks 150—connected in series—within a single battery housing 170, such as to produce a battery unit 100 of greater nominal voltage than a battery unit 100 containing a single folded battery cell stack 150.

In one implementation, the assembly system implements methods and techniques described above to fold a first anode assembly 110 and a first cathode assembly 130 into a first folded battery cell stack 150, such as: with the first side of the first anode collector 115 in the first anode assembly 110 not coated with anode material 122 or separator material and facing downwardly from the first folded battery cell stack 150 to mate with an interior face of an anode-side battery housing component 171; and with the second side of the last cathode collector 135 in the first cathode assembly 130 not coated with cathode material 142 or separator material and facing upwardly from the first folded battery cell stack 150. In this implementation, the assembly system repeats this process to then fold a second anode assembly 110 and a second cathode assembly 130 into a second folded battery cell stack 150 directly on top of the first folded battery cell stack 150, such as: with the first side of the first anode collector 115 in this second anode assembly 110 not coated with anode material 122 or separator material and directly in contact with the second side of the last cathode collector 135 in the first cathode assembly 130; and with the second side of the last cathode collector 135 in the second cathode assembly 130 not coated with cathode material 142 or separator material and facing upwardly from the second folded battery cell stack 150 to mate with an interior face of a cathode-side battery housing component 172.

The assembly system can then implement methods and techniques described above to assemble the battery housing 170 around the first and second folded battery cell stacks 150: with the first side of the first anode collector 115 in the first anode assembly 110 in contact with the base of the anode-side battery housing component 171; and with the second side of the last cathode collector 135 in the second cathode assembly 130 in contact with the base of the cathode-side battery housing component 172.

2.12.1 Multi-Cell Battery Unit from Resected Interconnects

In a similar variation shown in FIG. 9, the assembly system implements methods and techniques described above: to form an anode assembly 110 in which a first side of a first anode collector 115 and a second side of an intermediate anode collector 114—between the first anode collector 115 and a last anode collector 114 in the anode assembly 110—excludes anode material 122 and separator material; and to form a cathode assembly 130 in which a second side of a last cathode collector 135 and a first side of an intermediate cathode collector 134—between a first cathode collector 135 and the last anode collector 114 in the cathode assembly 130—excludes cathode material 142.

In this variation, the assembly system can then implement methods and techniques described above to fold the anode and cathode assembly 130 into a contiguous folded battery cell stack 150: with the first side of the first anode collector 115 facing downwardly to directly contact an interior face of the anode-side battery housing component 171; with the second side of the intermediate anode collector 114 directly in contact with the first side of the intermediate cathode collector 134; and with the second side of the last cathode collector 135 facing upwardly to directly contact an interior face of the cathode-side battery housing component 172.

The assembly system can then resect (i.e., "cut") both an intermediate anode interconnect 116 extending immediately upwardly from the intermediate anode collector 114 and an intermediate cathode interconnect 136 extending immediately downwardly from the intermediate cathode collector 134, thereby separating the contiguous folded battery cell into a first folded battery cell stack 150 and a second folded battery cell stack 150 connected in series. For example, the assembly system can resect the intermediate anode interconnect 116 and the intermediate cathode interconnect 136 with a laser cutter or mechanical shear before installing these folded battery cell stacks 150 into the battery housing 170.

Therefore, the first folded battery cell stack 150 can extend from the first side of the first anode collector 115 to the second side of the intermediate cathode collector 134. The second folded battery cell stack 150—above the first folded battery cell stack 150—can extend from the first side of the intermediate anode collector 114 to the second side of the last cathode collector 135. The first folded battery cell stack 150 and a second folded battery cell stack 150 can thus be connected in series across the intermediate anode collector 114 and the intermediate cathode collector 134.

2.13 Variation: Prefabricated Separator

One variation of the method S100 shown in FIGS. 3, 8A, 8B, 8C, and 8D includes: receiving an anode assembly 110 including a series of anode collectors 114 connected by a set of anode interconnects 116 in Block S110; receiving a cathode assembly 130 including a series of cathode collectors 134 connected by a set of cathode interconnects 136 in Block S112; locating a first anode collector 115, in the series of anode collectors 114, over a folding stage, in Block S120, a first side of the first anode collector 115 facing the folding stage, and a second side of the first anode collector 115 coated with a first anode electrode 120; locating a first prefabricated separator 160 over the first anode electrode 120 in Block S122; locating a first cathode collector 135, in the series of cathode collectors 134, over the first anode collector 115 in Block S130, a first side of the first cathode collector 135 coated with a first cathode electrode 140 in contact with the first prefabricated separator 160, and a second side of the first cathode collector 135 coated with a second cathode electrode 140; locating a second prefabricated separator 160 over the first cathode electrode 140 in Block S132; folding the anode assembly 110 along a first anode interconnect 116, in the set of anode interconnects 116 and interposed between the first anode collector 115 and a second anode collector 114 in the series of anode collectors 114, in Block S140 to locate the second anode collector 114 over the first cathode collector 135, a first side of the second anode collector 114 coated with a second anode electrode 120 in contact with the second prefabricated separator 160, and a second side of the second anode collector 114 coated with a third anode electrode 120; locating a third prefabricated separator 160 over the third anode electrode 120 in Block S142; folding the cathode assembly 130 along a first cathode interconnect 136, in the set of cathode interconnects 136 and interposed between the first cathode collector 135 and a second cathode collector 134 in the series of cathode collectors 134, in Block S150 to locate the second cathode collector 134 over the second anode collector 114, a first side of the second cathode collector 134 coated with a third cathode electrode 140 in contact with the third prefabricated separator 160, and a second side of the second cathode collector 134 coated with a fourth cathode electrode 140; wetting the first prefabricated separator 160, the second prefabricated separator 160, and the third prefabricated separator 160 with solvated ions 162 in Block S180; and loading the anode assembly 110 and the cathode assembly 130 into a battery housing 170 in Block S190 with the first side of the first anode collector 115 in contact with a first battery terminal of the battery housing 170 and with a second side of a last cathode collector 135, the series of cathode collectors 134, in contact with a second battery terminal of the battery housing 170.

Generally, in this variation, the anode assembly fabrication unit implements methods and techniques described above to fabricate an anode assembly 110 without separator material. The folding station then: implements methods and techniques similar to those described above to fold the anode assembly 110 and a cathode assembly 130 over the folding stage; and inserts a prefabricated separator 160 onto each collector after each fold cycle.

2.13.1 Separator Fabrication

In one implementation, the assembly system: laser- or die-cuts separators 160 from a tape or sheet of separator material; stacks these preformed separators 160; and loads this stack of preformed separators 160 into a magazine. For example, the assembly system cuts separators 160 that define geometries similar to and offset outwardly from the footprints of the anode and cathode collectors 134, such as: 10.5-millimeter-diameter preformed separators 160 for 10.0-millimeter-diameter anode and cathode collectors 134; or 3.5-millimeter by 30.5-millimeter rectilinear preformed separators 160 for 3.0-millimeter by 30.0-millimeter rectilinear anode and cathode collectors 134.

This magazine of preformed separators 160 is then located in the folding station, which installs individual preformed separators 160 between anode and cathode electrodes 120, 140.

2.13.2 Separator Installation

Figure 8B:
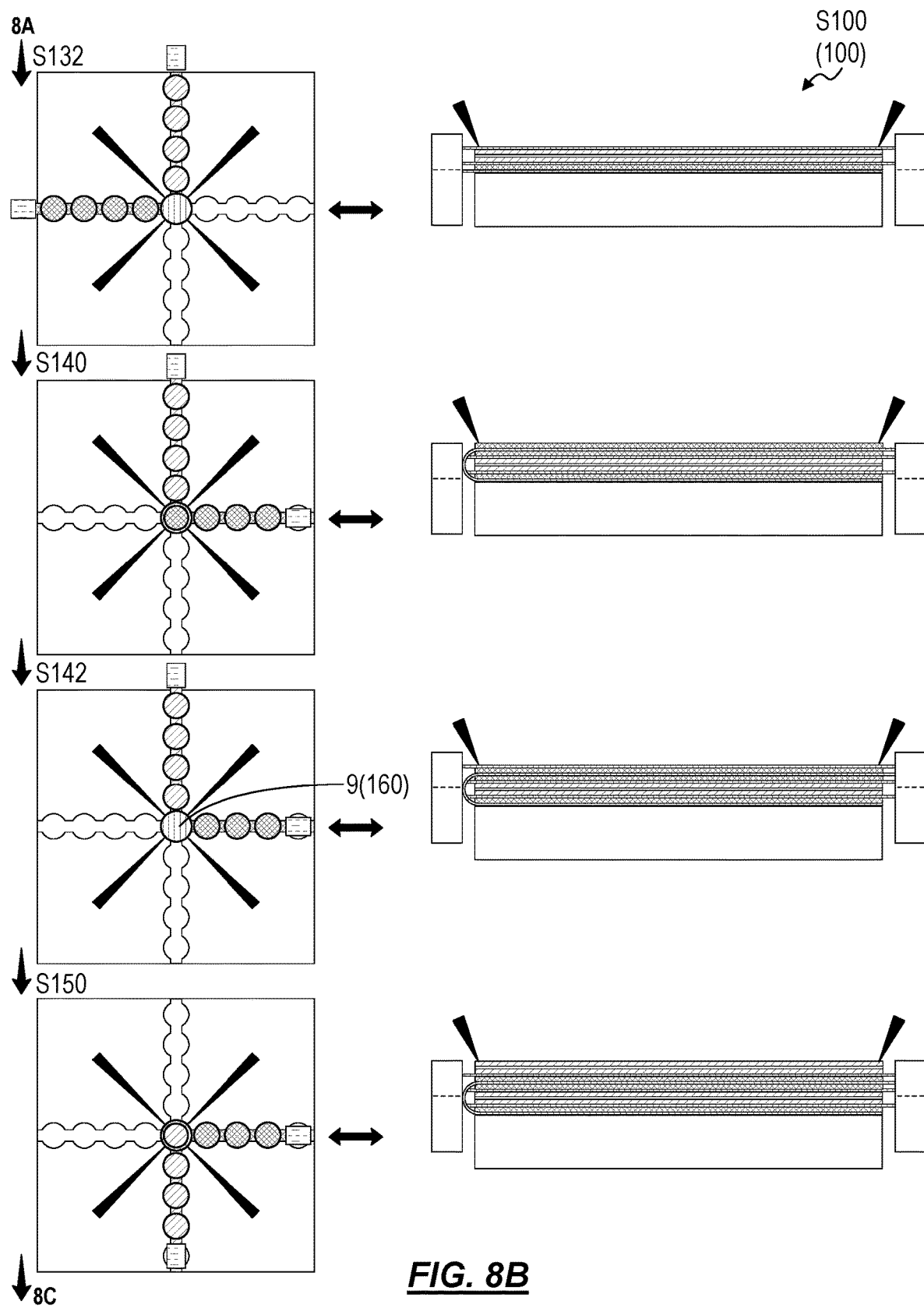
Figure 8C:
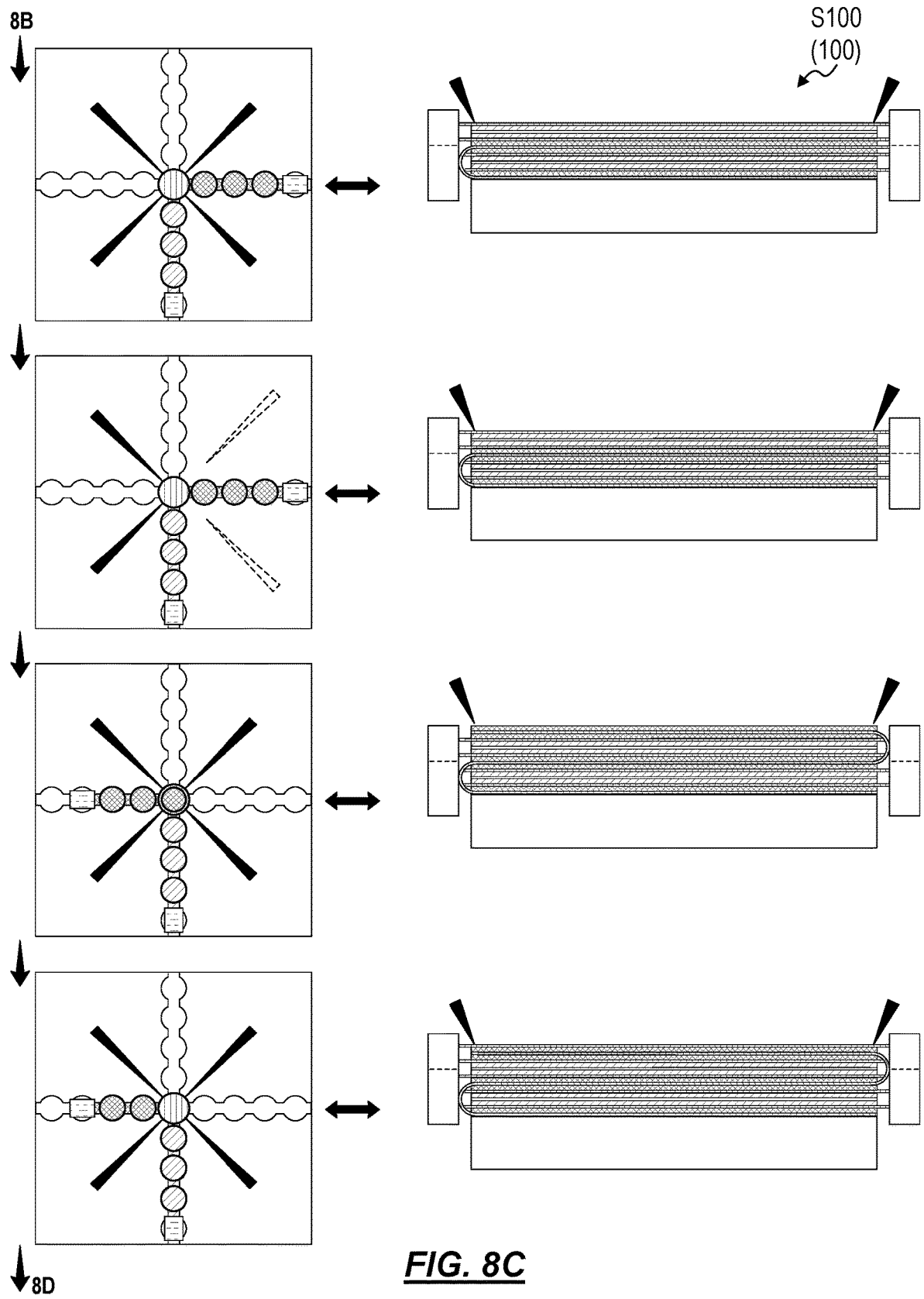
Figure 8D:
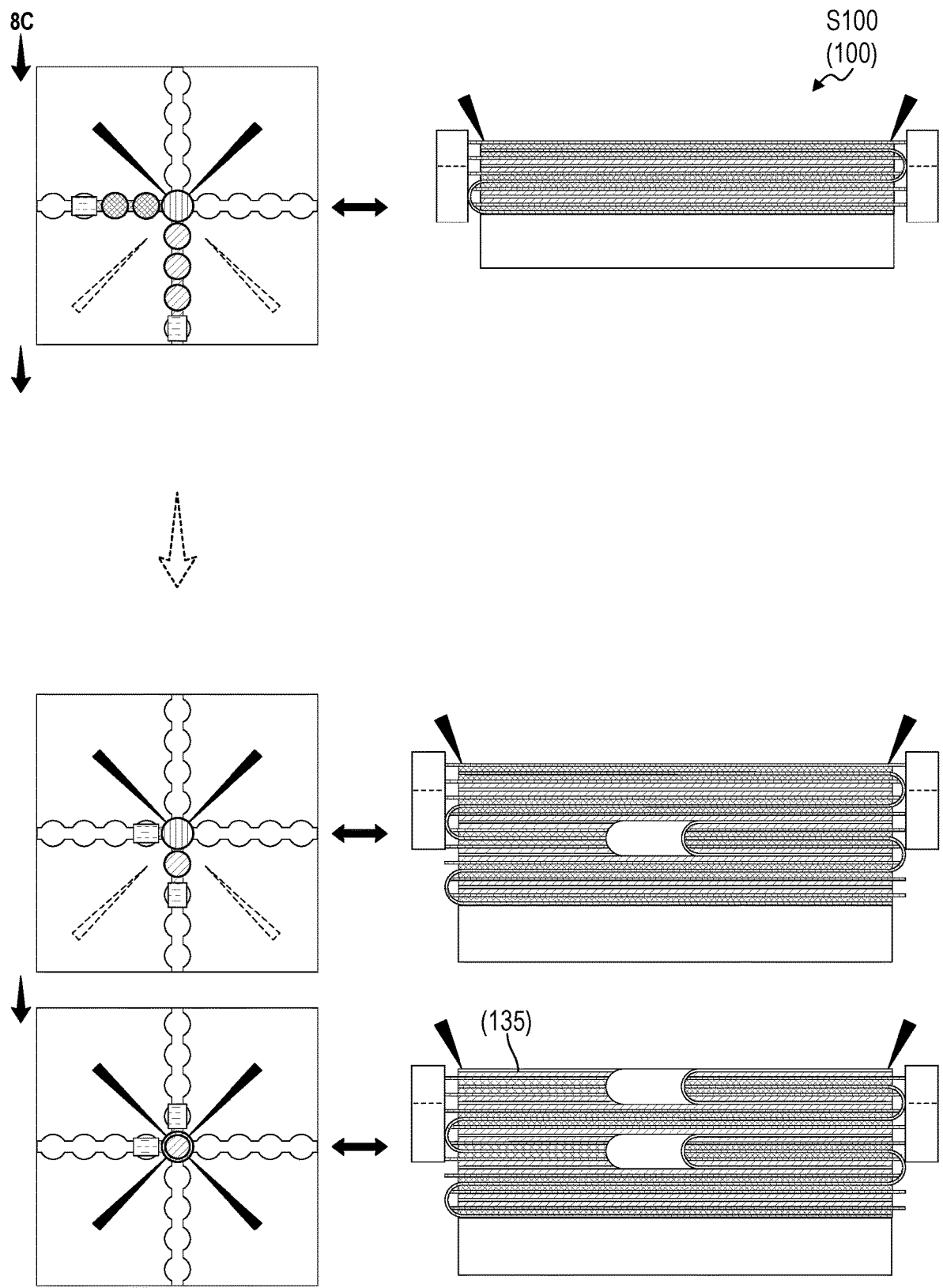

In particular, after locating the first anode collector 115—defining a first width—over the folding stage in Block S120, the folding station can: retrieve a first prefabricated separator 160, defining a second width greater than the first width, from the magazine of prefabricated separators 160; and locate the first prefabricated separator 160 over the first anode electrode 120 with an edge of the first prefabricated separator 160 extending past an edge of the first anode electrode 120 in Block S122, as shown in FIGS. 8A and 8B.

Then, after locating the first cathode collector 135 over the first anode collector 115 in Block S130, the folding station can: retrieve a second prefabricated separator 160 from the magazine of prefabricated separators 160; and locate the second prefabricated separator 160 over the second cathode electrode 140 with an edge of the second prefabricated separator 160 extending past an edge of the second cathode electrode 140 in Block S132.

Similarly, after folding the second anode collector 114 onto the first cathode collector 135 in Block S140, the folding station can: retrieve a third prefabricated separator 160 from the magazine of prefabricated separators 160; and locate the third prefabricated separator 160 over the third anode electrode 120 with an edge of the third prefabricated separator 160 extending past an edge of the third anode electrode 120 in Block S142.

2.13.3 Battery Cell Structure

Therefore, in this variation, the assembly system can: locate the first cathode collector 135 over the first anode collector 115 to form a first battery cell 151 that includes the first anode collector 115, the first anode electrode 120, the first prefabricated separator 160, the first cathode electrode 140, and the first cathode collector 135; fold the anode assembly 110 along the first anode interconnect 116 to form a second battery cell 152 that includes the first cathode collector 135, the second cathode electrode 140, the second prefabricated separator 160, the second anode electrode 120, and the second anode collector 114; and fold the cathode assembly 130 along the second anode interconnect 116 to form a third battery cell 153 that includes the second anode collector 114, the third anode electrode 120, the third prefabricated separator 160, the third cathode electrode 140, and the second cathode collector 134.

The assembly system can then load the anode assembly 110 and the cathode assembly 130 into the battery housing 170 with the first battery cell 151, the second battery cell 152, and the third battery cell 153 connected in parallel between the first battery terminal of the battery housing 170 and the second battery terminal of the battery housing 170 by the set of anode interconnects 116 and the set of cathode interconnects 136.

2.14 Variation: First-Layer Cathode

Another variation of the method S100 includes: receiving a cathode assembly 130 including a series of cathode collectors 134 connected by a set of cathode interconnects 136 in Block S112; receiving an anode assembly 110 including a series of anode collectors 114 connected by a set of anode interconnects 116 in Block S110; locating a first cathode collector 135, in the series of cathode collectors 134, over a folding stage in Block S130, a first side of the first cathode collector 135 facing the folding stage, and a second side of the first cathode collector 135 coated with a first cathode electrode 140 and a first separator 160; locating a first anode collector 115, in the series of anode collectors 114, over the first cathode collector 135 in Block S120, a first side of the first anode collector 115 coated with a first anode electrode 120 in contact with the first separator 160, and a second side of the first anode collector 115 coated with a second anode electrode 120; folding the cathode assembly 130 along a first cathode interconnect 136, in the set of cathode interconnects 136 and interposed between the first cathode collector 135 and a second cathode collector 134 in the series of cathode collectors 134, in Block S150 to locate the second cathode collector 134 over the first anode collector 115, a first side of the second cathode collector 134 coated with a second cathode electrode 140 and a second separator 160 in contact with the second anode electrode 120, and a second side of the second cathode collector 134 coated with a third cathode electrode 140 and a third separator 160; folding the anode assembly 110 along a first anode interconnect 116, in the set of anode interconnects 116 and interposed between the first anode collector 115 and a second anode collector 114 in the series of anode collectors 114, in Block S140 to locate the second anode collector 114 over the second cathode collector 134, a first side of the second anode collector 114 coated with a third anode electrode 120 in contact with the third separator 160, and a second side of the second anode collector 114 coated with a fourth anode electrode 120; wetting the first separator 160, the second separator 160, and the third separator 160 with solvated ions 162 in Block S180; and loading the cathode assembly 130 and the anode assembly 110 into a battery housing 170 in Block S190 with the first side of the first cathode collector 135 in contact with a first battery terminal of the battery housing 170 and with a second side of a last anode collector 114, the series of anode collectors 114, in contact with a second battery terminal of the battery housing 170.

Generally, in this variation, the assembly system can implement methods and techniques described above to fold cathode and anode assemblies into a folded battery cell stack 150 by: first locating a first side of a first cathode collector 135—uncoated with cathode material 142 or separator material—onto the folding stage; then locating a first anode collector 115 over the first cathode collector 135; folding the cathode assembly 130 along a first cathode interconnect 136 to locate a second cathode collector 134 over the first anode collector 115; and then folding the anode collector 114 along a first anode interconnect 116 to locate a second anode collector 114 over the second cathode collector 134; etc. The assembly system can then package the resulting folded battery cell stack 150 within a battery housing 170 to complete a battery unit 100.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A system comprising:
an anode substrate:
comprising conductive material;
defining a set of anode collectors comprising:
first sides coated with an anode material; and
second sides coated with the anode material;
defining a set of anode interconnects interposed between and electrically coupling adjacent anode collectors in the set of anode collectors; and
folded across the set of anode interconnects to locate the set of anode collectors in a vertical anode stack;
a cathode substrate:
comprising conductive material;
defining a set of cathode collectors, each cathode collector in the set of cathode collectors comprising:
first sides coated with a cathode material; and
second sides coated with the cathode material;
defining a set of cathode interconnects interposed between and electrically coupling adjacent cathode collectors in the set of cathode collectors; and
folded across the set of cathode interconnects to locate the set of cathode collectors in a vertical cathode stack;
a battery housing:
comprising a first battery housing component electrically coupled to a first side of a first anode collector in the set of anode collectors;
comprising a second battery housing component opposite the first battery housing component and electrically coupled to a second side of a last cathode collector in the set of cathode collectors; and
housing the anode substrate and the cathode substrate:
with individual anode collectors, in the set of anode collectors, interposed between consecutive cathode collectors in the set of cathode collectors;
with the set of anode interconnects extending around and isolated from the set of cathode collectors;
with individual cathode collectors, in the set of cathode collectors, interposed between consecutive anode collectors in the set of anode collectors; and
with the set of cathode interconnects extending around and isolated from the set of anode collectors; and
a set of separators, each separator, in the set of separators:
arranged between an anode collector, in the set of anode collectors, and an adjacent cathode collector, in the set of cathode collectors, housed within the battery housing;
defining a discrete structure physically distinct from each other separator in the set of separators; and
configured to transport ions between anode material on the anode collector and cathode material on the adjacent cathode collector.
2. The system of claim 1, wherein each separator in the set of separators:
is interposed between an anode electrode of anode material on an anode collector, in the set of anode collectors, and a cathode electrode of cathode material on an adjacent cathode collector, in the set of cathode collectors; and
extends beyond perimeters of the anode electrode and the cathode electrode to prevent direct contact between the anode electrode and the cathode electrode.
3. The system of claim 1, wherein the anode substrate is folded across the set of anode interconnects and the cathode substrate is folded across the set of cathode interconnects to interdigitate individual anode collectors, in the set of anode collectors, between adjacent cathode collectors, in the set of cathode collectors.
4. The system of claim 3, wherein the set of separators comprises a set of preformed non-conductive coupons inserted between:
first sides of anode collectors in the set of anode collectors and second sides of cathode collectors in the set of cathode collectors; and
second sides of anode collectors in the set of anode collectors and first sides of cathode collectors in the set of cathode collectors.
5. The system of claim 4, wherein each preformed non-conductive coupon, in the set of preformed non-conductive coupons, comprises a polypropylene disk defining a porous structure saturated with solvated ions.
6. The system of claim 1, wherein each separator, in the set of separators, comprises a separator slurry:
deposited onto a side of an anode collector, in the set of anode collectors;
cured across the side of the anode collector prior to folding of the set of anode interconnects; and
wetted with solvent and solvated ions following insertion of the anode substrate and the cathode substrate into the first battery housing component.
7. The system of claim 1:
wherein the anode substrate comprises a metallic foil of a first type;
wherein the cathode substrate comprises a metallic foil of a second type;
wherein the anode material comprises graphite; and
wherein the cathode material comprises a lithium-based crystalline solid.
8. The system of claim 1:
wherein a first anode collector, in the set of anode collectors, comprises:
a first side excluding the anode material and in contact with a base of the first battery housing component; and
a second side coated with the anode material and facing a first side of a first cathode collector, in the set of cathode collectors; and
wherein a last anode collector, in the set of cathode collectors, comprises:
a first side coated with the cathode material and facing a second side of a last anode collector, in the set of anode collectors; and
a second side excluding the cathode material and in contact with an interior surface of the second battery housing component.
9. The system of claim 1:
wherein each anode interconnect, in the set of anode interconnects, defines:
a first side excluding the anode material; and
a second side excluding the anode material;
wherein each cathode interconnect, in the set of cathode interconnects, defines:
a first side excluding the cathode material; and
a second side excluding the cathode material; and
further comprising an electrical insulator located between interior walls of the first battery housing component and the set of cathode interconnects, extending outwardly from the set of cathode collectors in the vertical cathode stack, to shield the set of cathode interconnects from shorting against the first battery housing component.

10. The system of claim 1:
wherein the set of anode collectors and the set of anode interconnects comprise a first unitary conductive layer cut to form the set of anode collectors arranged in a single anode row;
wherein each anode collector in the set of anode collectors defines a first width and is offset from an adjacent anode collector, in the set of anode collectors, by an anode pitch distance greater than the first width;
wherein the set of cathode collectors and the set of cathode interconnects comprise a second unitary conductive layer cut to form the set of cathode collectors arranged in a single cathode row;
wherein each cathode collector in the set of cathode collectors defines a second width and is offset from an adjacent cathode collector, in the set of cathode collectors, by a cathode pitch distance greater than the second width; and
wherein the first battery housing component defines an internal width greater than the first width and the second width to accommodate the set of anode interconnects and the set of cathode interconnects.

11. The system of claim 10:
wherein each anode collector, in the set of anode collectors, defines a circular footprint of the first width;
wherein each cathode collector, in the set of cathode collectors, defines a circular footprint of the second width; and
wherein the battery housing defines a cylindrical coin cell housing.

12. The system of claim 1:
wherein each anode collector, in the set of anode collectors, defines a truncated-circular footprint comprising:
    a first edge;
    a second edge opposite the first edge;
    a third edge orthogonal to the first edge; and
    a fourth edge opposite the third edge;
wherein each cathode collector, in the set of cathode collectors, defines a truncated-circular footprint comprising:
    a fifth edge approximately parallel to first edges of the set of anode collectors;
    a sixth edge opposite the fifth edge;
    a seventh edge orthogonal to the fifth edge and approximately parallel to third edges of the set of anode collectors; and
    an eighth edge opposite the seventh edge;
wherein the set of anode interconnects:
    extend between and electrically couple first edges and second edges of adjacent anode collectors in the set of anode collectors; and
    extend around fifth edges and sixth edges of cathode collectors in the set of cathode collectors; and
wherein the set of cathode interconnects:
    extend between and electrically couple seventh edges and eighth edges of adjacent cathode collectors in the set of cathode collectors; and
    extend around third edges and fourth edges of anode collectors in the set of anode collectors.

13. The system of claim 12:
wherein the battery housing comprises a coin cell housing defining an internal cylindrical section; and
wherein the anode substrate, folded into the vertical anode stack, is arranged in the battery housing with truncated-circular footprints of the set of anode collectors approximately centered within the internal cylindrical section.

14. The system of claim 1:
wherein each anode collector, in the set of anode collectors, defines a rectilinear footprint comprising:
    a first edge of a first length;
    a second edge opposite the first edge;
    a third edge orthogonal to the first edge of a second length greater than the first length; and
    a fourth edge opposite the third edge;
wherein each cathode collector, in the set of cathode collectors, defines a rectilinear footprint including:
    a fifth edge of the first length and approximately parallel to first edges of the set of anode collectors;
    a sixth edge opposite the fifth edge;
    a seventh edge of the second length, orthogonal to the fifth edge, and approximately parallel to third edges of the set of anode collectors; and
    an eighth edge opposite the seventh edge;
wherein the set of anode interconnects:
    extend between and electrically couple first edges and second edges of adjacent anode collectors in the set of anode collectors; and
    extend around fifth edges and sixth edges of cathode collectors in the set of cathode collectors;
wherein the set of cathode interconnects:
    extend between and electrically couple seventh edges and eighth edges of adjacent cathode collectors in the set of cathode collectors; and
    extend around third edges and fourth edges of anode collectors in the set of anode collectors; and
wherein the battery housing comprises a coin cell housing defining an internal cuboid section.

15. The system of claim 1:
wherein each anode collector, in the set of anode collectors, defines:
    a first width; and
    a first length; and
wherein each anode interconnect, in the set of anode interconnects, defines:
    a second width less than 20% of the first width; and
    a second length less than 20% of the first length.

16. The system of claim 1:
wherein each anode collector, in the set of anode collectors:
    defines an anode collector thickness; and
    comprises a second side coated with the anode material of an anode electrode thickness;
wherein each cathode collector, in the set of cathode collectors:
    defines a cathode collector thickness; and
    comprises a first side coated with the cathode material of a cathode electrode thickness;
wherein each separator, in the set of separators defines a separator thickness; and
wherein each anode interconnect, in the set of anode interconnects, is folded over a bend radius approximating a sum of:
    half of the anode collector thickness;
    the anode electrode thickness;
    the separator thickness;
    the cathode electrode thickness; and
    half of the cathode collector thickness.

17. The system of claim 1:
wherein a first anode collector in the set of anode collectors, a first anode electrode of anode material arranged on a second side of the first anode collector, a first cathode collector in the set of cathode collectors, a first cathode electrode of cathode material arranged on a first side of the first cathode collector, and a first separator interposed between the first anode electrode and the first cathode electrode cooperate to form a first battery cell in a set of battery cells;

wherein a second anode collector in the set of anode collectors, a second anode electrode of anode material arranged on a first side of the second anode collector, the first cathode collector, a second cathode electrode of cathode material arranged on a second side of the first cathode collector, and a second separator interposed between the second anode electrode and the second cathode electrode cooperate to form a second battery cell in the set of battery cells; and wherein the set of battery cells are connected in parallel between the first battery housing component and the second battery housing component.

18. A system comprising:

a series of anode collectors;

a first set of anode electrodes comprising an anode material and arranged on first sides of the series of anode collectors;

a second set of anode electrodes comprising the anode material and arranged on second sides of the series of anode collectors;

a set of anode interconnects:
 interposed between and electrically coupling adjacent anode collectors in the series of anode collectors; and
 folded to locate the series of anode collectors in a boustrophedonic anode stack;

a series of cathode collectors;

a first set of cathode electrodes comprising a cathode material and arranged on first sides of the series of cathode collectors;

a second set of cathode electrodes comprising the cathode material and arranged on second sides of the series of cathode collectors;

a set of cathode interconnects:
 interposed between and electrically coupling adjacent cathode collectors in the series of cathode collectors; and
 folded to locate the series of cathode collectors in a boustrophedonic cathode stack;

a battery housing:
 housing the boustrophedonic anode stack and the boustrophedonic cathode stack with individual cathode collectors, in the boustrophedonic cathode stack, interposed between consecutive anode collectors in the boustrophedonic anode stack;
 comprising a first battery housing component electrically coupled to a first side of a first anode collector in the set of anode collectors; and
 comprising a second battery housing component opposite the first battery housing component and electrically coupled to a second side of a last cathode collector in the set of cathode collectors; and a first set of separators, each separator, in the first set of separators:
 arranged between an anode electrode, in the first set of anode electrode, and an adjacent cathode electrode, in the second set of cathode electrodes:
  defining a discrete structure physically distinct from each other separator in the set of separators; and
  configured to transport ions between the anode electrode and the adjacent cathode electrode; and a second set of separators, each separator, in the second set of separators:
 arranged between an anode electrode, in the second set of anode electrodes, and an adjacent cathode electrode, in the first set of cathode electrodes:
  defining a discrete structure physically distinct from each other separator in the set of separators; and
  configured to transport ions between the anode electrode and the adjacent cathode electrode.

19. The system of claim 18, wherein the boustrophedonic anode stack and the boustrophedonic cathode stack are interdigitated:

with the set of anode interconnects:
 extending outwardly from the series of anode collectors; and
 extending around and isolated from the set of cathode collectors; and with the set of cathode interconnects:
 extending outwardly from the series of cathode collectors orthogonal to the set of anode interconnects; and
 extending around and isolated from the set of anode collectors.

20. A system comprising:

a series of anode collectors;

a set of anode electrodes comprising an anode material arranged on first sides and second sides of anode collectors in the series of anode collectors;

a set of anode interconnects:
 interposed between and electrically coupling adjacent anode collectors in the series of anode collectors; and
 folded to locate the series of anode collectors in a boustrophedonic anode stack;

a series of cathode collectors;

a set of cathode electrodes comprising a cathode material arranged on first sides and second sides of cathode collectors in the series of cathode collectors;

a set of cathode interconnects:
 interposed between and electrically coupling adjacent cathode collectors in the series of cathode collectors; and
 folded to locate the series of cathode collectors in a boustrophedonic cathode stack with cathode collectors, in the series of cathode collectors, interdigitated between anode collectors, in the series of anode collectors; and a set of separators, each separator, in the set of separators:
 arranged between an anode electrode, in the set of anode electrodes, and an adjacent cathode electrode, in the set of cathode electrodes;
 defining a discrete structure physically distinct from each other separator in the set of separators; and
 configured to transport solvated ions between the anode electrode and the adjacent cathode electrode.

* * * * *